(12) United States Patent
Kimbara et al.

(10) Patent No.: US 6,802,875 B1
(45) Date of Patent: Oct. 12, 2004

(54) HYDROGEN SUPPLY SYSTEM FOR FUEL CELL

(75) Inventors: Masahiko Kimbara, Kariya (JP);
Yoshihiro Isogai, Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 869 days.

(21) Appl. No.: 09/651,694

(22) Filed: Aug. 30, 2000

(30) Foreign Application Priority Data

Aug. 30, 1999 (JP) .......................................... 11-243182

(51) Int. Cl.[7] .......................... H01M 8/04; H01M 8/06; C01H 3/00
(52) U.S. Cl. ................................... 48/61; 48/85.1
(58) Field of Search .................. 48/61, 62 R, 85.1, 48/89, 102 R, 106, 102 A, 93–95, 118.5, 119, 120, 128, 211, 214 R; 422/105, 109, 110, 188–191, 193, 198, 202–204, 234–237; 429/17, 19–21

(56) References Cited

U.S. PATENT DOCUMENTS

| 3,505,116 A | 4/1970 | Weisz | |
|---|---|---|---|
| 4,933,054 A | 6/1990 | Mazanec et al. | 204/80 |
| 5,591,315 A | * 1/1997 | Mazanec et al. | 205/462 |
| 6,051,173 A | * 4/2000 | Fasano et al. | 264/44 |
| 6,051,329 A | * 4/2000 | Fasano et al. | 429/30 |
| 6,287,432 B1 | * 9/2001 | Mazanec et al. | 204/265 |
| 6,296,687 B2 | * 10/2001 | Wachsman et al. | 95/55 |

FOREIGN PATENT DOCUMENTS

| CA | 1 146 725 | 5/1983 |
|---|---|---|
| DE | 195 23 109 A1 | 1/1997 |

* cited by examiner

Primary Examiner—Samuel M. Heinrich
(74) Attorney, Agent, or Firm—Morgan & Finnegan, LLP

(57) ABSTRACT

A hydrogen supply system for a fuel cell, which is small and discharges almost no carbon dioxide. The hydrogen supply system includes a fuel chamber for storing isopropyl alcohol (IPA), a dehydrogenation reactor for forming hydrogen gas and acetone gas from IPA, a gas-liquid separator for separating hydrogen gas from acetone liquid, and a recovery chamber for storing the acetone liquid. The separated hydrogen gas is supplied to the fuel cell.

25 Claims, 13 Drawing Sheets

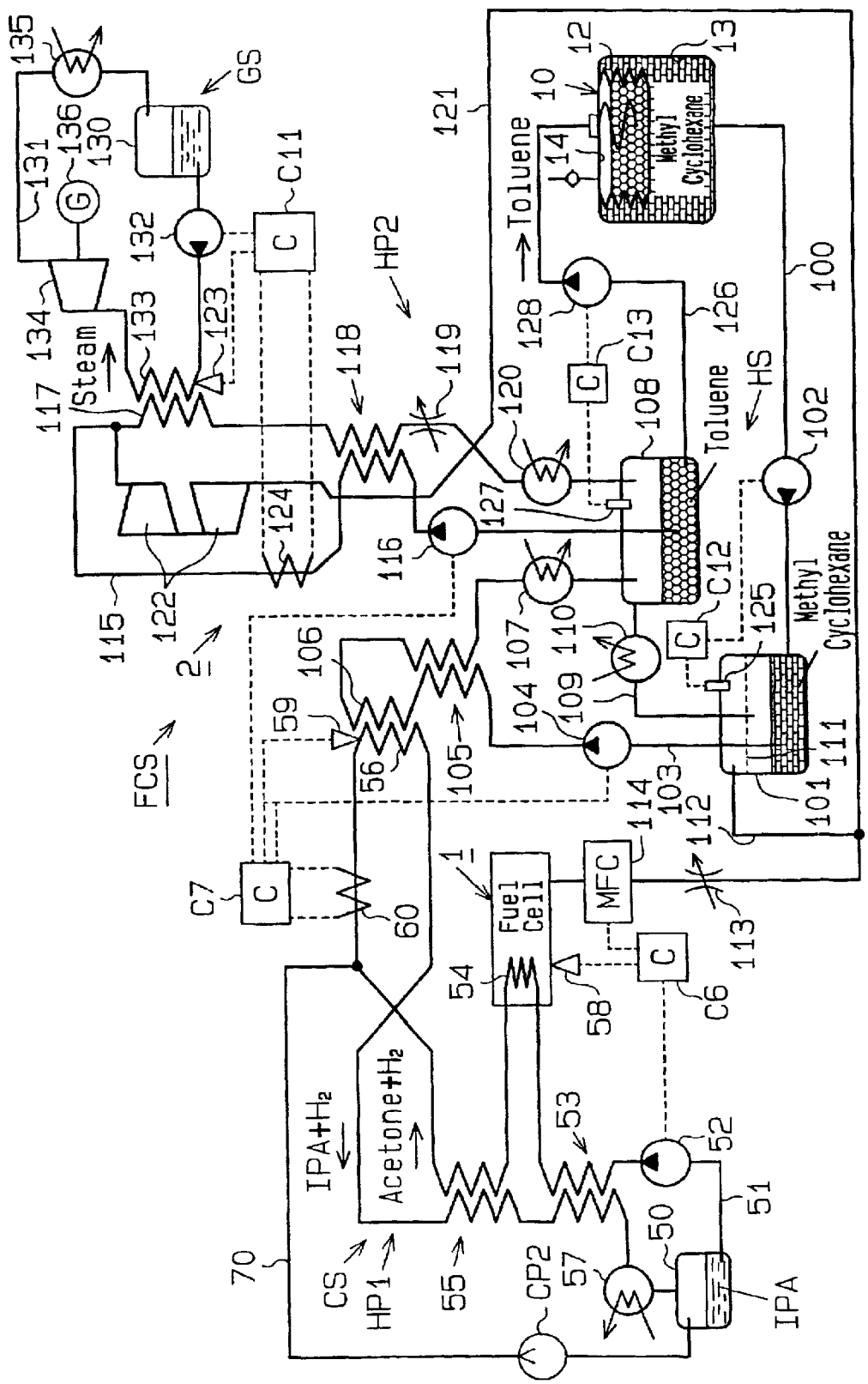

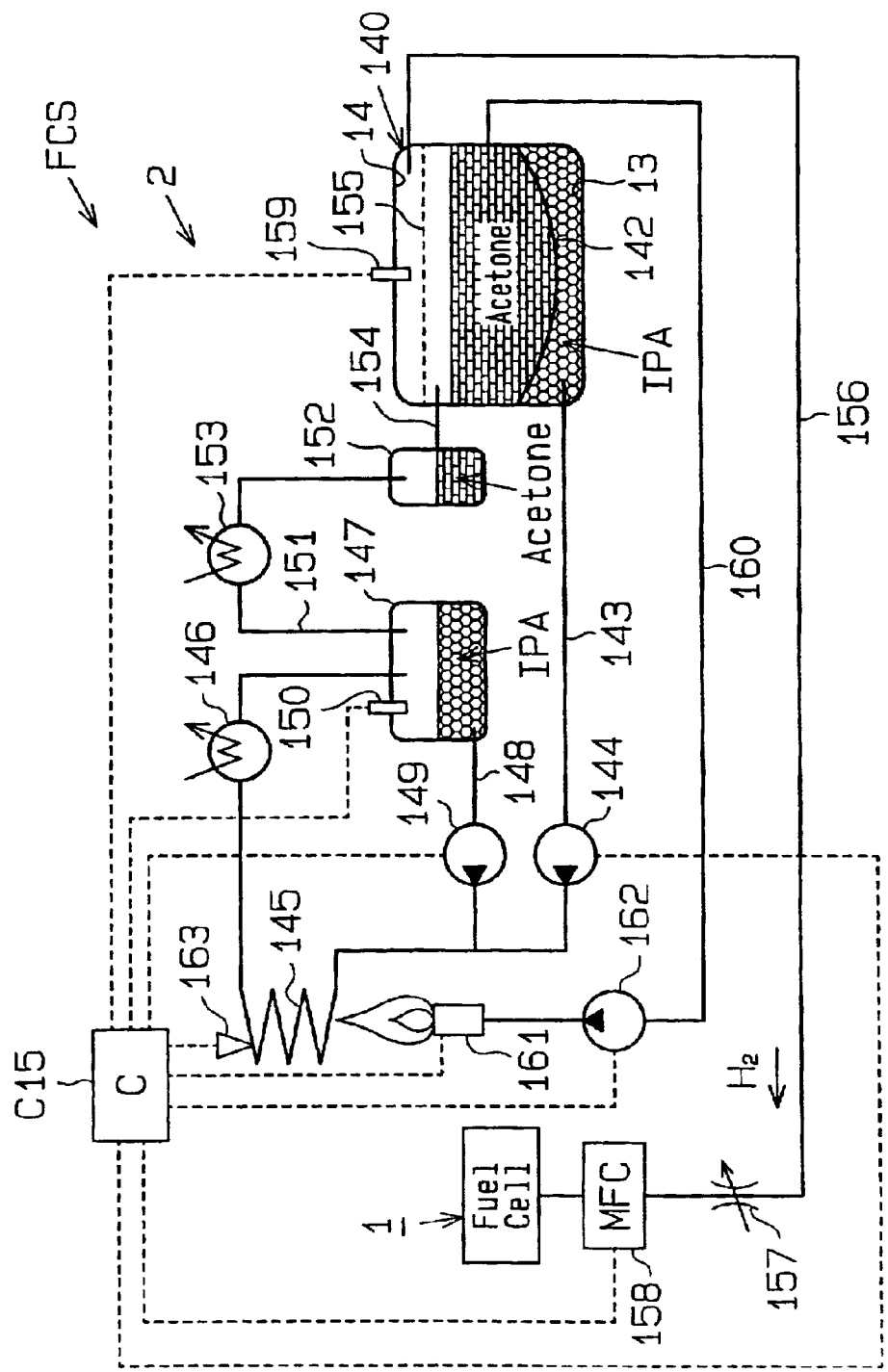

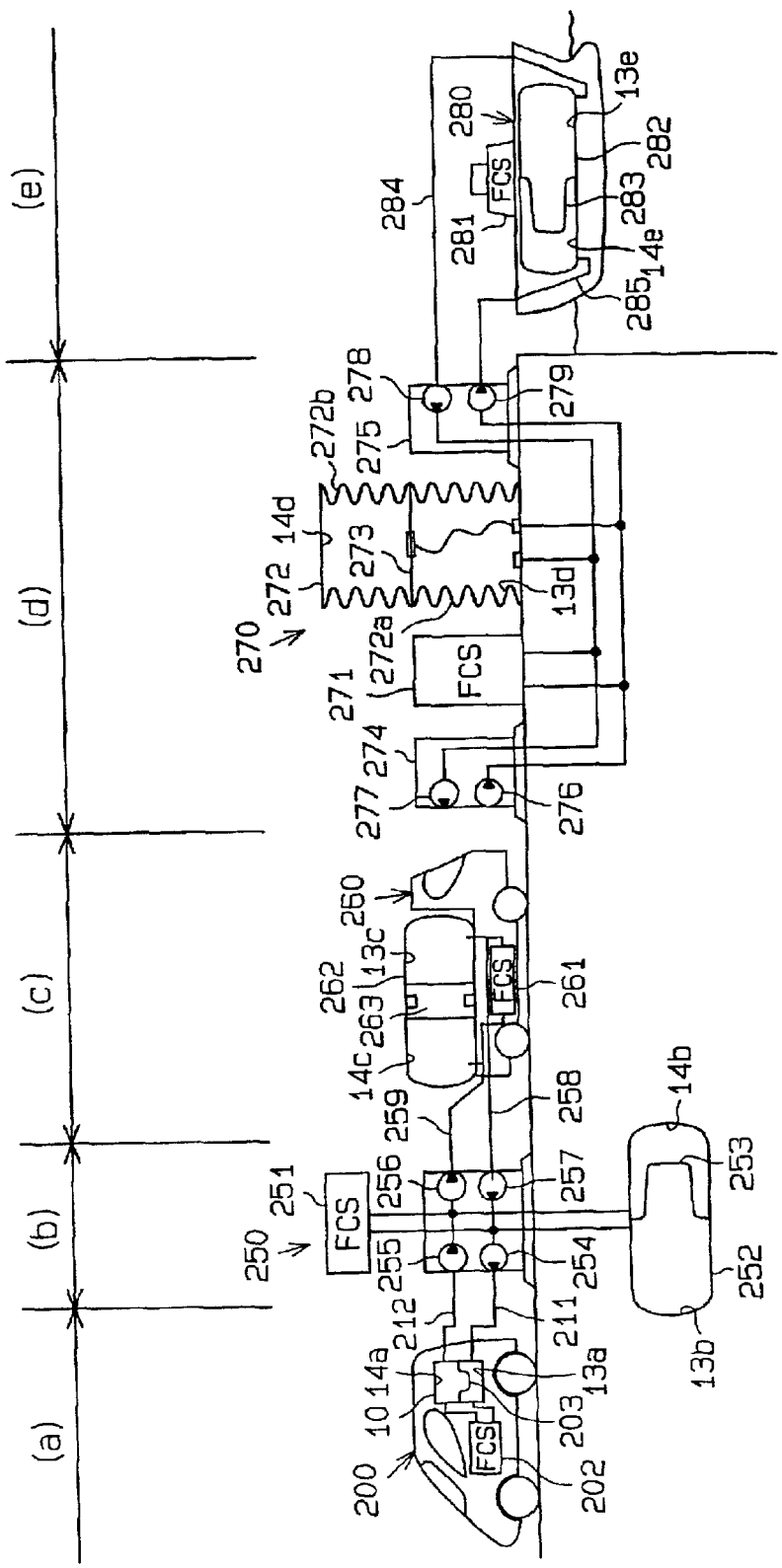

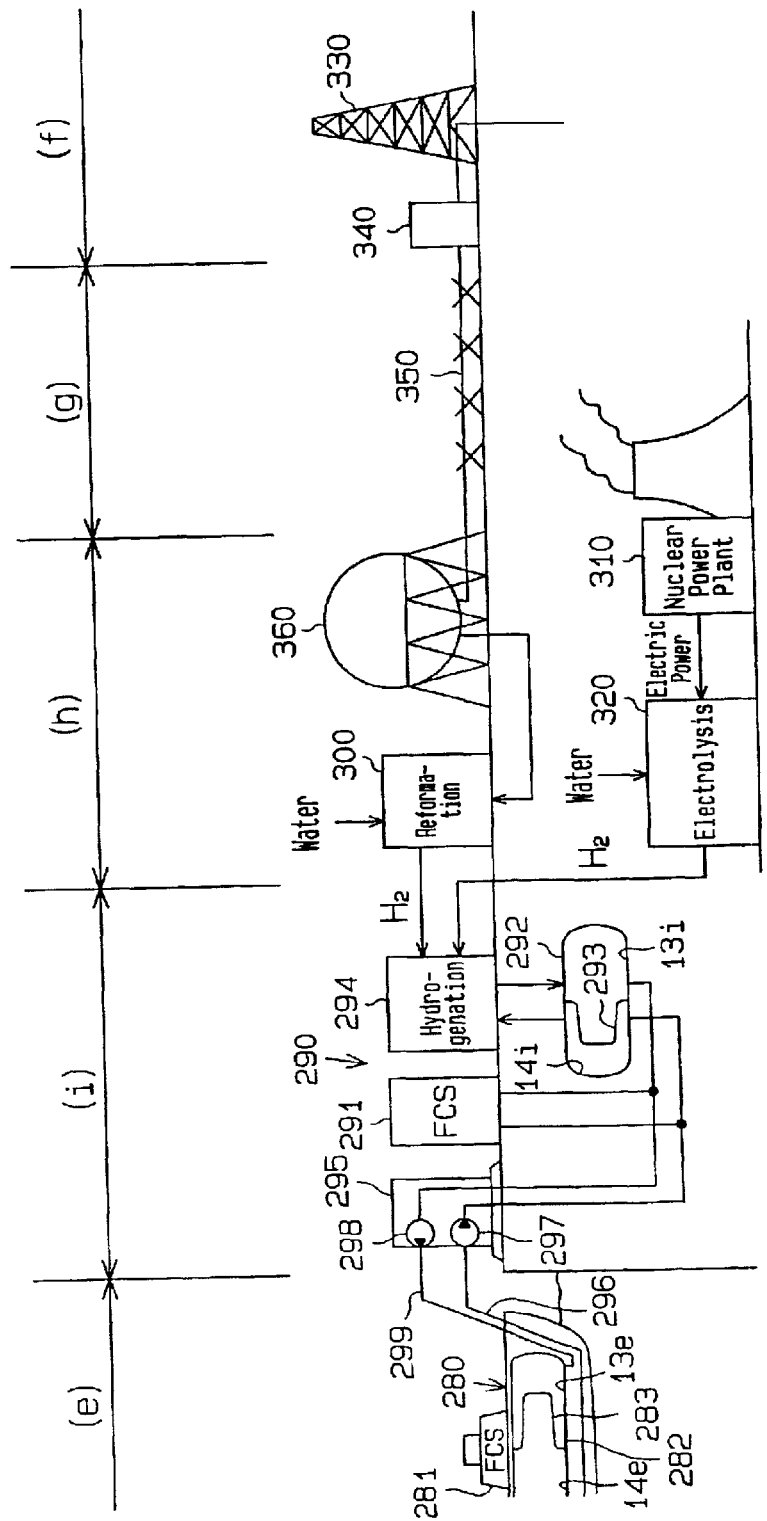

HYDROGEN SUPPLY SYSTEM FOR FUEL CELL

BACKGROUND OF THE INVENTION

The present invention relates to a hydrogen supply system for a fuel cell, and a method for recycling a fuel and a system for recycling the fuel for the hydrogen supply system.

Fuel cells have a high energy efficiency and can readily be miniaturized. Therefore, fuel cells have been employed as a power source for electric cars. Particularly, a solid polymer fuel cell is advantageous as a power source for automobiles and household power plants since the operation temperature thereof is relatively low (100° C. or less).

In one type of fuel cell, electromotive force is produced by a reaction that forms water from hydrogen and oxygen. This reaction requires a hydrogen supply system for supplying hydrogen to the fuel cell.

A fuel cell for an automobile is preferably light and small. A heavy fuel cell deteriorates fuel consumption, and a large fuel cell is disadvantageous in that it is difficult to design the location of a vehicle on which the fuel cell is mounted. Thus, a hydrogen supply system that is small, light, and can supply hydrogen in an amount sufficient for running over a long distance is needed.

Generally, for increasing the power generation efficiency of a fuel cell, it is preferred to employ a method of supplying pure hydrogen to the fuel cell. Known methods for supplying pure hydrogen include using high pressure hydrogen gas stored in a gas tank (high pressure gas mode), using hydrogen absorbed in a metal alloy having hydrogen absorbed therein (hydrogen absorption metal alloy mode), using the liquid hydrogen stored in a heat insulating tank (liquid hydrogen mode), and supplying a mixed gas of hydrogen and carbon dioxide gas obtained by reforming a hydrocarbon compound, such as methane, methanol or the like.

However, the high pressure gas method is too large. In the liquid hydrogen method, a gasifying loss occurs, and a great amount of energy is required for liquefying hydrogen, and thus, the overall efficiency is low. The hydrogen absorption metal alloy method requires an alloy 50 times or more heavier than the weight of hydrogen to be supplied. Therefore, the weight of the system is too high. The high pressure gas method and the hydrogen absorption metal alloy method require equipment for supplying hydrogen. On the other hand, liquid hydrogen is difficult to handle because it is cryogenic. Developments of methods and apparatuses for automatically supplying liquid hydrogen are progressing; however, an infrastructure will be required.

A hydrogen supply system in which hydrogen is formed by reforming a hydrocarbon compound, such as methanol, gasoline or the like, is now being developed. The reformation of a hydrocarbon compound uses a liquid organic compound as a fuel, which is easy to handle.

The methanol reformation method includes a steam reformation method, a partial oxidation reformation method, and an auto-thermal method, in which the thermal balance is maintained by combining the above two modes. The reaction formulae are as follows.

Steam reformation: 
Partial oxidation reformation: 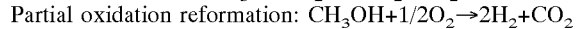

However, in each of the above reactions, carbon in the hydrocarbon compound (methanol) is discharged into air as $CO_2$. Therefore, these methods are not favored from the viewpoint of preventing global warming.

Further, the power generation efficiency of fuel cells is generally about 50%, and the remaining 50% becomes waste heat. For protecting the solid polymer electrolyte membrane used in the fuel cell from the heat of reaction during power generation, it is necessary to discharge the reaction heat efficiently. Conventionally, a fuel cell is cooled by a cooling apparatus having a radiator, which maintains the operation temperature at 100° C. or lower. In this cooling apparatus, the heat of the fuel cell is transferred from the radiator with cooling water. However, since the difference between the temperature of the cooling water (e.g., 60 to 80° C.) discharged and the external environmental temperature (e.g., 30° C.) around the radiator is small, the heat dissipation efficiency of the radiator was poor. For this reason, a fuel cell system typically includes a large radiator having a large heat dissipation area, and as a result, the fuel cell system is large.

SUMMARY OF THE INVENTION

The first object of the present invention is to provide a hydrogen supply system for use in a fuel cell, which is advantageous in that it is relatively small, can supply pure hydrogen to the fuel cell, and discharges almost no carbon dioxide gas. Also provided is a system for recycling the fuel used by a fuel cell system. The second object of the present invention is to reduce the size of the fuel cell system.

To achieve the above object, the present invention provides a hydrogen supply system for supplying hydrogen to a fuel cell. The hydrogen supply system has a fuel chamber for storing a liquid fuel, which includes a hydrogen containing organic compound, a dehydrogenation apparatus for dehydrogenating the fuel to form hydrogen gas and a by-product, a gas-liquid separation apparatus for separating the hydrogen gas from the by-product by liquefying the by-product and for supplying the separated hydrogen gas to the fuel cell, and a recovery chamber for recovering and storing the by-product liquefied in the gas-liquid separation apparatus.

A further aspect of the present invention provides a method for recycling a fuel used in a hydrogen supply system for a fuel cell. The fuel cell and the hydrogen supply system are placed at a first region. The hydrogen supply system has a fuel chamber for storing a liquid fuel, which includes an organic compound containing hydrogen, a dehydrogenation apparatus for dehydrogenating the fuel to form hydrogen gas and a by-product, a gas-liquid separation apparatus for liquefying the by-product to separate the hydrogen gas from the by-product, and a recovery chamber for recovering and storing the by-product. The separated hydrogen gas is supplied to the fuel cell. The method includes a first transportation step for transporting the by-product from the first region to a second region, which is different from the first region, using a first mobile tanker, a regeneration step for regenerating the fuel by hydrogenating the by-product in the second region, and a second transportation step for transporting the fuel regenerated to refueling equipment placed at the first region using a second mobile tanker.

Another aspect of the present invention provides a refueling equipment for storing a fuel used in a hydrogen supply system for use in a fuel cell. The hydrogen supply system has a fuel chamber of the hydrogen supply system for storing a liquid fuel, which includes an organic compound containing hydrogen, a dehydrogenation apparatus for dehydrogenating the fuel to form hydrogen gas and a by-product, a gas-liquid separation apparatus for liquefying the by-product to separate the hydrogen gas from the by-product, and a recovery chamber of the hydrogen supply system for recovering and storing the by-product in the gas-liquid separation apparatus. The separated hydrogen-gas is supplied to the fuel cell. The refueling equipment includes a fuel chamber of the refueling equipment for storing a fuel used in the hydrogen supply system, a recovery chamber of the refueling equipment for recovering and storing the by-product in the recovery chamber of the hydrogen supply system, and a movable partition for separating the fuel chamber of the refueling equipment and the recovery chamber of the refueling equipment, wherein the movable partition changes the volume of the fuel chamber of the refueling equipment and the volume of the recovery chamber of the refueling equipment by moving depending on the liquid amount in the fuel chamber of the refueling equipment and the liquid amount in the recovery chamber of the refueling equipment.

Another aspect of the present invention provides a mobile tanker. The mobile tanker has a fuel cell, a hydrogen supply system for supplying hydrogen to the fuel cell, an electric actuator driven by the fuel cell, and a tank, and moves by the electric actuator. The hydrogen supply system has a dehydrogenation apparatus for forming hydrogen gas and a by-product from a liquid fuel, which comprises an organic compound containing hydrogen, and a gas-liquid separation apparatus for liquefying the by-product to separate the hydrogen gas from the by-product, and the separated hydrogen gas being supplied to the fuel cell. The tank includes a tank fuel chamber for containing and transporting the fuel for the hydrogen supply system and the mobile tanker, a tank recovery chamber for recovering and storing the by-product from the gas-liquid separation apparatus, and a movable partition for separating the tank fuel chamber and the tank recovery chamber. The movable partition changes the volume of the tank fuel chamber and the volume of the tank recovery chamber by moving depending on the liquid amount in the tank fuel chamber and the liquid amount in the tank recovery chamber.

A further aspect of the present invention provides a system for recycling a fuel for use in a fuel cell. The recycling system includes a vehicle having a fuel cell and a hydrogen supply system for supplying hydrogen to the fuel cell, external recovery means for recovering the by-product from the recovery chamber into an external recovery tank, fuel regeneration means for hydrogenating the by-product in the external recovery tank to regenerate the fuel, and refueling means for supplying the fuel regenerated to the vehicle. The hydrogen supply system has a dehydrogenation apparatus for forming hydrogen gas and a by-product from a liquid fuel, which includes an organic compound containing hydrogen, a gas-liquid separation apparatus for liquefying the by-product to separate the hydrogen gas from the by-product, and a recovery chamber for recovering and storing the by-product in the gas-liquid separation apparatus.

A further aspect of the present invention provides a vehicle having a fuel cell and a hydrogen supply system for supplying hydrogen to the fuel cell. The hydrogen supply system includes a dehydrogenation apparatus for forming hydrogen gas and a by-product from a liquid fuel that includes a hydrogen-containing organic compound, a gas-liquid separation apparatus for separating the hydrogen gas from the by-product by liquefying the by-product and for supplying the separated hydrogen gas to the fuel cell, and a recovery chamber for recovering and storing the by-product liquified in the gas-liquid separation apparatus.

A further aspect of the present invention provides a household power plant having a fuel cell and a hydrogen supply system for supplying hydrogen to the fuel cell. The hydrogen supply system includes a dehydrogenation apparatus for forming hydrogen gas and a by-product from a liquid fuel including a hydrogen-containing organic compound, a gas-liquid separation apparatus for separating the hydrogen gas from the by-product by liquefying the by-product and for supplying the separated hydrogen gas to the fuel cell, and a recovery chamber for recovering and storing the by-product liquified in the gas-liquid separation apparatus.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 9 is a schematic circuit diagram of a fuel cell system of the third embodiment of the present invention.

FIG. 10 is a schematic circuit diagram of a fuel cell system of the fourth embodiment of the present invention.

FIG. 16 is a partial diagrammatic view of a system for recycling a fuel of the ninth embodiment of the present invention FIG. 17 is a partial diagrammatic view of a system for recycling a fuel.

DETAILED DESCRIPTION OF THE PREFERRED EMBODIMENTS

First Embodiment

A fuel cell system FCS of the first embodiment of the present invention will be described with reference to FIGS. 1 to 3. The fuel cell system FCS is, for example, a household power plant or is mounted to a vehicle.

The fuel cell system FCS has a solid polymer electrolyte fuel cell 1 and a hydrogen supply system 2 for supplying hydrogen gas to the fuel cell 1. The fuel cell 1 has a plurality of cells including a fuel electrode and an air electrode, which are partitioned by a polymer electrolyte membrane. In the fuel cell 1, hydrogen supplied to the fuel electrode and oxygen, which is in air supplied to the air electrode, react with each other through the electrolyte membrane. Thus, the fuel cell 1 generates power. The air supply system is not shown. The structure of the fuel cell 1 will be described later.

Figure 2:
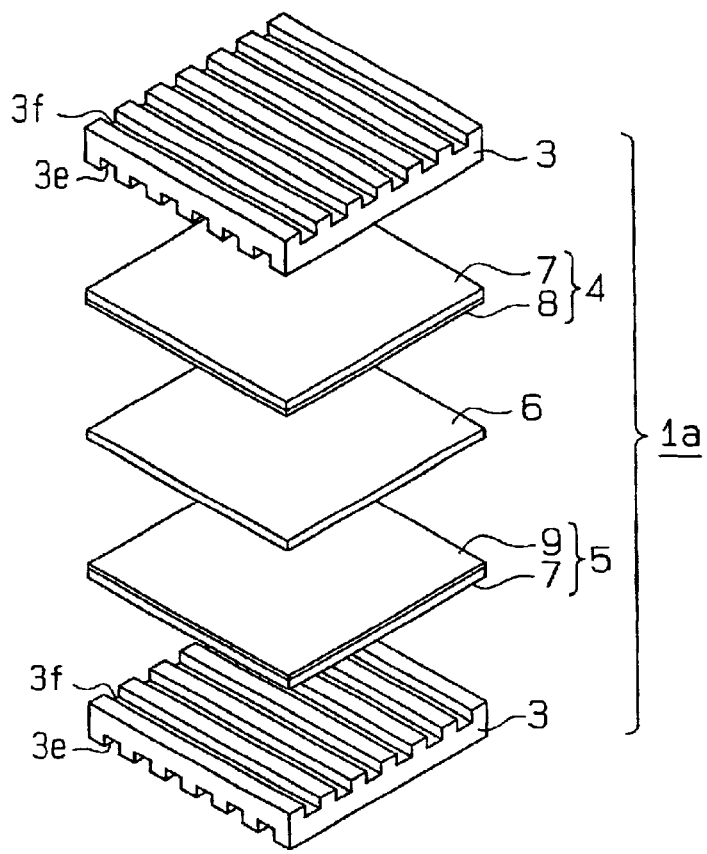
FIG. 2 is an exploded perspective view showing a unit cell of a fuel cell.

As shown in FIG. 2, a unit cell 1a in the fuel cell 1 has a pair of ribbed separators 3, a pair of electrodes 4, 5 located between the separators 3, and an electrolyte membrane 6 located between the electrodes 4, 5. The anode electrode 4 has an anode catalyst layer 8 formed on a porous support layer 7. The cathode electrode 5 has a cathode catalyst layer 9 formed on the porous support layer 7. The anode electrode 4 serves as a fuel electrode and the cathode electrode 5 serves as an air electrode. Hydrogen flows in one direction along a fuel grooves 3e in the separator 3 on the side of anode electrode 4. Air flows along an air grooves 3f in the separator 3 on the side of the cathode electrode 5. The direction of the hydrogen flow is perpendicular to the direction of the air flow. The operation temperature of the fuel cell 1 is about 80° C.

Using isopropyl alcohol (IPA; $(CH_3)_2CHOH$) as a fuel, the hydrogen supply system 2 supplies hydrogen gas obtained by the dehydrogenation reaction of IPA to the fuel cell 1.

The dehydrogenation reaction of IPA is represented by the following formula:

$$(CH_3)_2CHOH(liq.) \rightarrow (CH_3)_2CO(gas) + H_2(gas) + 100.4 \text{ kJ/mol.}$$

By this reaction, acetone $(CH_3)_2CO$ and hydrogen $H_2$ are formed. This reaction is an endothermic reaction, and proceeds in the presence of a catalyst at a reaction temperature of about 80° C.

The hydrogenation reaction of acetone is represented by the following formula:

$$(CH_3)_2CO(gas) + H_2(gas) \rightarrow (CH_3)_2CHOH(liq.) - 100.4 \text{ kJ/mol.}$$

This reaction is an exothermic reaction, and proceeds in the presence of a catalyst at a reaction temperature of about 200° C. By the hydrogenation reaction of acetone, IPA is regenerated.

In the fuel cell system FCS, the by-product (acetone) of the dehydrogenation reaction of IPA is recovered and stored. This process is called a reaction liquid store process. In addition, in the fuel cell system FCS, by using the hydrogenation-dehydrogenation reaction, a chemical heat pump using IPA/acetone/$H_2$ as a medium is established. The heat discharge system containing this chemical heat pump transfers the heat of the fuel cell 1, which is used as a heat source for the dehydrogenation reaction. The chemical heat pump also functions as a fuel regeneration system for regenerating IPA by the hydrogenation of acetone. IPA and acetone are liquids at room temperature and are stored in the fuel cell system FCS in a liquid state.

Figure 1:
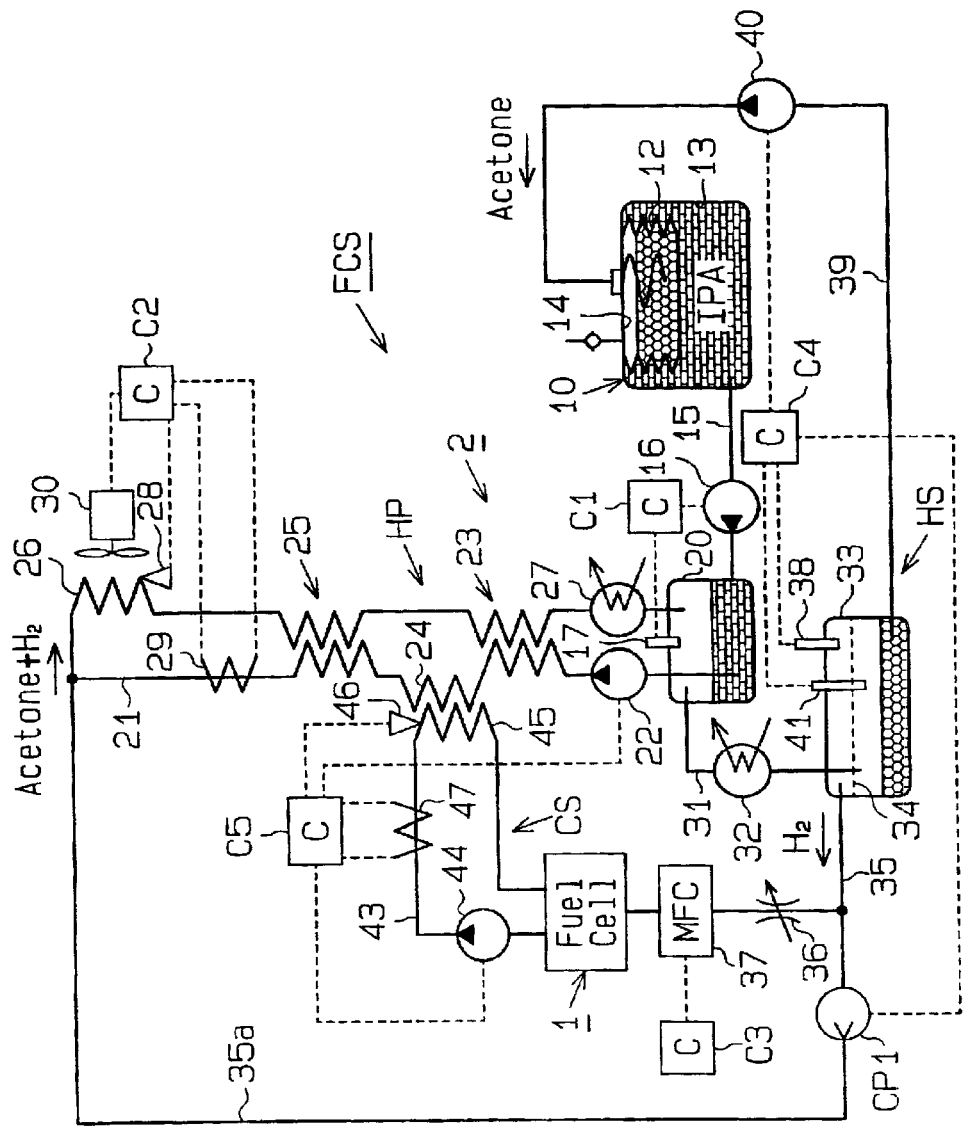
FIG. 1 is a schematic circuit diagram of a fuel cell system of the first embodiment of the present invention.
Figure 3A:
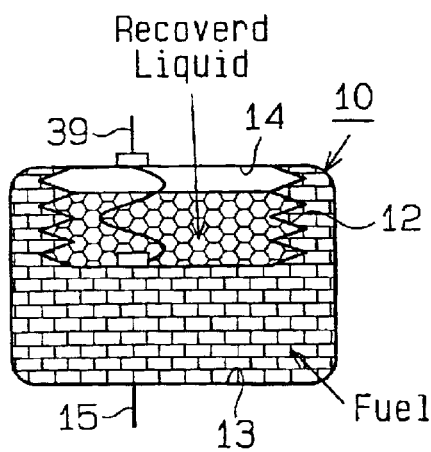
FIGS. 3a and 3b are sectional side elevations of a fuel tank.
Figure 3B:
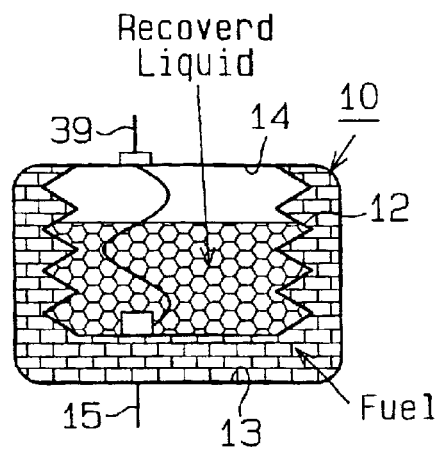

As shown in FIG. 1, the hydrogen supply system 2 includes a fuel tank 10, a chemical heat pump system HP, a hydrogen separation circuit HS, and a cell cooling circuit CS. The fuel tank 10 separates IPA from acetone, which is obtained by the dehydrogenation of IPA, and stores IPA. As shown in FIGS. 3a and 3b, the fuel tank 10 includes an inner container 12, which serves as a movable partition. The inner container 12 has an extendable bellows structure, and its volume is changeable. The inner portion of the fuel tank 10 is partitioned by the inner container 12 into a fuel chamber 13 and a recovery chamber 14. The fuel tank 10 has a refueling chamber and a discharge outlet (not shown). IPA is fed to the fuel chamber 13 through a refueling inlet. Acetone in the recovery chamber 14 is discharged from the fuel tank 10 through the discharge outlet. The inner container 12 extends depending on the amount of the IPA consumed and the amount of the acetone recovered. That is, the volume of the fuel chamber 13 is decreased by the volume of the IPA consumed, and the volume of the recovery chamber 14 is increased by the volume of the IPA consumed.

The fuel chamber 13 is connected to an auxiliary tank 20 through an IPA pipe 15. A pump 16 provided on the IPA pipe 15 feeds IPA from the fuel chamber 13 to the auxiliary tank 20. The auxiliary tank 20 is provided with a level sensor 17 for detecting the level of IPA. The signal detected by the level sensor 17 is transmitted to a controller C1. When the level of IPA becomes lower than a predetermined level, the controller C1 drives the pump 16 to feed IPA from the fuel chamber 13 to the auxiliary tank 20.

The inlet and outlet of a circulation pipe 21 are connected to the auxiliary tank 20. The circulation pipe 21 is provided with a pump 22, a first heat exchanger 23, a dehydrogenation reactor 24, a second heat exchanger 25, a hydrogenation reactor 26 and a condenser 27.

A dehydrogenation catalyst is placed in the dehydrogenation reactor 24. The dehydrogenation catalyst may be, for example, a fine particle metal nickel catalyst, a precious metal catalyst carried by carbon, a Raney nickel catalyst, or a nickel boride catalyst. Platinum, ruthenium, rhodium, or palladium may be used as the precious metal catalyst. The dehydrogenation reaction of IPA in the dehydrogenation reactor 24 is conducted at about 80° C. Further, a catalyst is placed in the hydrogenation reactor 26. As the catalyst, a nickel catalyst (for example, an activated carbon carrying particulate nickel) is used.

In the hydrogenation reactor 26, an equilibrium mixture of IPA gas, acetone gas and hydrogen gas is obtained by the hydrogenation reaction of acetone, which requires a temperature of about 200° C. The heat of the hydrogenation reactor 26, i.e., sensible heat, is used for preheating the acetone/hydrogen mixed gas in the second heat exchanger 25 and for preheating IPA in the first heat exchanger 23.

The hydrogenation reactor 26 is provided with a temperature sensor 28. The signal detected by the temperature sensor 28 is transmitted to a controller C2. The controller C2 controls a heater 29 and a cooling fan 30 to maintain the internal temperature of the hydrogenation reactor 26 at the hydrogenation reaction temperature (about 200° C.). The hydrogenation reactor 26 and the cooling fan 30 serves as a heat exhausting apparatus.

The equilibrium mixture of IPA, acetone and hydrogen is cooled when it is passed through the heat exchangers 25, 23. The IPA gas (boiling point: 82° C.) in the equilibrium mixture is liquefied in the condenser 27. Then, the equilibrium mixture returns to the auxiliary tank 20. The hydrogen gas and acetone gas in the auxiliary tank 20 are led through a gas recovery pipe 31 to a gas-liquid separator 33. Acetone (boiling point: 56° C.) is liquefied in a condenser 32 provided on the gas recovery pipe 31, and the resultant acetone liquid is stored in the gas-liquid separator 33.

The gas-liquid separator 33 is provided with a hydrogen separation membrane (hydrogen permeable membrane) 34. Only hydrogen gas among the gases in the gas-liquid separator 33 can permeate the hydrogen separation membrane 34. In FIG. 1, a hydrogen supply pipe 35 for supplying hydrogen gas to the fuel cell 1 is connected to the upper portion of the gas-liquid separator 33, that is, the gas-liquid separator 33 at the downstream side of the hydrogen separation membrane 34.

The hydrogen supply pipe 35 is provided with a reducing valve (variable valve) 36 and a mass flow controller (MFC), i.e., a hydrogen flow rate control valve 37. The hydrogen flow rate control valve 37 has a flow rate detecting portion for detecting the flow rate of hydrogen gas and a control valve for feedback controlling the opening of the hydrogen flow rate control valve 37 based on the flow rate signal. When a controller C3 determines that it is necessary to generate power, referring to the power consumed by the external load, the controller C3 controls the opening of the hydrogen flow rate control valve 37 according to the amount of power required. Thus, hydrogen gas is supplied to the fuel cell 1 according to the amount of power required. The reducing valve 36 reduces the pressure of hydrogen led to the hydrogen flow rate control valve 37 to a predetermined pressure. A branched pipe 35a of the hydrogen supply pipe 35 is connected to the circulation pipe 21 at the upstream side of the hydrogenation reactor 26. A compressor CP1 is provided on the branched pipe 35a. A hydrogen pressure sensor 38 detects the pressure in the gas-liquid separator 33 and transmits the detected signal to a controller C4. The controller C4 drives the compressor CP1 based on the detected signal so that the pressure in the gas-liquid separator 33 does not exceed a predetermined value.

A drain pipe 39 for draining acetone liquid connects the gas-liquid separator 33 and the recovery chamber 14. The drain pipe 39 is provided with a drain pump 40. A level sensor 41 detects the level of acetone in the gas-liquid separator 33, and transmits the detected signal to the controller C4. The controller C4 drives the drain pump 40 based on the detected signal so that the acetone liquid in the gas-liquid separator 33 is allowed to drain into the recovery chamber 14 when the level of the acetone liquid exceeds a predetermined level. The auxiliary tank 20, the condensers 27, 32, the gas-liquid separator 33 and the hydrogen separation membrane 34 serve as a gas-liquid separation apparatus.

In the endothermic reaction that occurs in the dehydrogenation reactor 24, the heat of a cell cooling circuit CS for cooling the fuel cell 1 is used as a heat source. A cooling pipe 43 is connected to the fuel cell 1. The cooling pipe 43 is provided with a cooling pump 44 and a heat dissipation pipe 45. The heat dissipation pipe 45 transfers heat to the dehydrogenation reactor 24. The operation temperature of the fuel cell 1 is about 80° C. The cooling water (warm water) flowing through the heat dissipation pipe 45 heats the dehydrogenation reactor 24 and is used as a heat source of the endothermic reaction that occurs in the dehydrogenation reactor 24. A temperature sensor 46 measures the internal temperature of the dehydrogenation reactor 24. A controller C5 controls a heater 47 provided on the cooling pipe 43 based on the temperature detected by the temperature sensor 46 to adjust the internal temperature of the dehydrogenation reactor 24 to the reaction temperature (about 80° C.).

When the temperature of the fuel cell 1 is below the operation temperature, for example, immediately after the fuel cell system FCS starts to operate, the dehydrogenation reactor 24 is indirectly heated by the heater 47. After the temperature of the fuel cell 1 reaches the operation temperature, the dehydrogenation reactor 24 is heated mainly by the waste heat of the fuel cell 1. The heat of the cooling water flowing through the heat dissipation pipe 45 is efficiently removed by the endothermic reaction in the dehydrogenation reactor 24, thus improving the heat discharge efficiency of the fuel cell 1. The controllers C1 to C5 constitute a control unit for controlling the fuel cell system FCS.

The fuel cell system FCS operates as follows.

For example, when power is consumed by an external load, such as a vehicle, household appliances, or the like, and it is determined that power generation by the fuel cell system FCS is required, the opening of the hydrogen flow rate control valve 37 is controlled according to the amount of the power required. Hydrogen is supplied from the gas-liquid separator 33 to the fuel electrode of the fuel cell 1 at a flow rate according to the amount of the power required while air is supplied from the unillustrated air supply apparatus to the air electrode. Thus, a reaction between the hydrogen and the oxygen proceeds in the fuel cell 1. The fuel cell 1 applies the electromotive force generated in this reaction to the external load.

In the dehydrogenation reactor 24, the dehydrogenation reaction (endothermic reaction) of IPA proceeds using the waste heat of the fuel cell 1 as a heat source, so that hydrogen gas and acetone gas are formed. The formed hydrogen gas and acetone gas are heated to about 200° C. and led to the hydrogenation reactor 26. In the hydrogenation reactor 26, the acetone gas is hydrogenated to form an equilibrium mixture of IPA gas, hydrogen gas and acetone gas. The equilibrium mixture gas returns to the auxiliary tank 20 through the heat exchangers 25, 23 and the condenser 27. In the auxiliary tank 20, the liquefied IPA is separated. The hydrogen gas and acetone gas are supplied to the gas-liquid separator 33 through the condenser 32. The liquefied acetone is separated in the gas-liquid separator 33 and recovered in the recovery chamber 14 by the drain pump 40. On the other hand, only the hydrogen gas among the gases stored in the gas-liquid separator 33 permeates the hydrogen separation membrane 34, so that pure hydrogen gas is supplied to the fuel cell 1 through the supply pipe 35.

The fuel cell system FCS provides the following advantages.

(1) Pure hydrogen obtained by the dehydrogenation reaction of IPA is supplied to the fuel cell 1. Acetone, which is a by-product, is recovered and stored in the fuel tank 10. Therefore, the fuel cell system FCS discharges no carbon dioxide. Further, since pure hydrogen is supplied to the fuel cell 1, the power generation efficiency of the fuel cell system FCS is improved, as compared to that of conventional fuel cell systems, which require the supply of a mixed gas of carbon dioxide and hydrogen.

In addition, since the fuel and the recovered liquid are liquid organic compounds that can be easily handled, the refueling operation is easy. In other words, since it is not necessary to handle liquid hydrogen fuel or hydrogen gas fuel, there is a hydrogen supply process, which is advantageous in that the handling of a fuel is easy, as compared to known hydrogen supply processes that are capable of supplying pure hydrogen, such as a high pressure gas process, a liquid hydrogen process, a hydrogen absorption metal alloy process and the like. Further, a liquid by-product at ordinary temperature is obtained, and the liquid by-product can be easily separated from hydrogen gas simply by cooling or expansion. Accordingly, the by-product is easily recovered.

(2) The fuel cell system FCS is light, as compared to the fuel cell system in a hydrogen absorption metal alloy process, which uses a heavy material such as a metal alloy having hydrogen absorbed therein. In addition, in the fuel cell system FCS, the energy loss is small, the handling is easy, and it is advantageous from the viewpoint of setting up an infrastructure, as compared to a liquid hydrogen storage system. Further, the fuel cell system FCS requires only a small fuel tank and is therefore compact, as compared to the fuel cell system of a high pressure hydrogen storage process. Accordingly, the first embodiment is a preferred the fuel cell system FCS.

(3) The fuel cell system FCS is small, light and can be handled with ease, and thus it is a practical fuel cell system FCS for vehicles.

(4) An acetone liquid is recovered in the recovery chamber 14 which extends automatically depending on the amount of the fuel consumed. That is, the fuel tank 10 is an effective storage space for the recovered liquid. Therefore, the fuel cell system FCS is small.

(5) The waste heat of the fuel cell 1 is first used in dehydrogenation reactor (endothermic reactor) 24. The waste heat is carried to the hydrogenation reactor (exothermic reactor) 26, where the temperature is raised to about 200° C. Then the waste heat is exhausted. The temperature of the hydrogenation reactor 26, which functions as a radiator is about 200° C., and the ambient temperature is, for example, 30 to 50° C., thus, the temperature difference is large. Therefore, the cooling efficiency of the hydrogenation reactor 26 by the cooling fan 30 is improved. As a result, the hydrogenation reactor 26 is cooled by a relatively small radiator, which permits miniaturization of the fuel cell system FCS.

(6) The molecular weight of the by-product (acetone) is larger than that of hydrogen. Therefore, the pores of the hydrogen separation membrane 34 are large, compared to the membranes used when hydrogen and CO formed by conventional methanol steam reformation are separated. As a result, the flow rate of the permeating hydrogen per unit area of the hydrogen separation membrane 34 is relatively great, and therefore, the hydrogen separation membrane 34 has a small surface area.

(7) IPA is regenerated by the hydrogenation of acetone in the hydrogenation reactor 26, and hydrogen is effectively used in this reaction. Therefore, the amount of power generated per unit of fuel is increased, and the fuel cell system FCS is miniaturized. When the fuel cell system FCS is used in a vehicle, the distance covered per unit of fuel is relatively high.

Below, the second to eleventh embodiments of the present invention will be described mainly with respect to the features that differ from those of the first embodiment. Like parts are indicated by like reference numerals.

Second Embodiment

The fuel cell system FCS of the second embodiment of the present invention will be described below with reference to FIGS. 4 to 7.

The difference between the second embodiment and the first embodiment resides in the cooling circuit for the fuel cell 1, the hydrogen supply system 2 and the fuel. In the fuel cell system FCS of the second embodiment, the fuel cell 1 is cooled by the endothermic effect of a chemical heat pump. Specifically, in the cooling circuit for the fuel cell 1, a chemical heat pump using IPA/acetone/$H_2$ (hereinafter, referred to as "IPA/acetone-type") as a medium that undergoes an endothermic reaction at the operation temperature (about 80° C.) of the fuel cell 1 is employed.

Cyclohexane is preferred as fuel capable of being divided into hydrogen. The reasons for this are as follows. (1) It is possible to use the heat (waste heat) of the chemical heat pump in the fuel cell cooling circuit as a heat source to advance the dehydrogenation reaction. (2) It is possible to establish a chemical heat pump in the hydrogenation-dehydrogenation reaction circuit. (3) It is possible to establish a chemical heat pump that causes a dehydrogenation reaction (endothermic reaction) at about 200° C. (4) The mole quantity of hydrogen formed per mole of the fuel is large.

A two-stage heat pump system comprised of an IPA/acetone-type chemical heat pump and a cyclohexane/benzene-type chemical heat pump is constructed. The IPA/acetone-type chemical heat pump is a low-temperature chemical heat pump, and the cyclohexane/benzene-type chemical heat pump is a high-temperature chemical heat pump. The heat of the low-temperature chemical heat pump is absorbed by the high-temperature chemical heat pump. Then, the heat is transferred from the high-temperature chemical heat pump.

Figure 4:
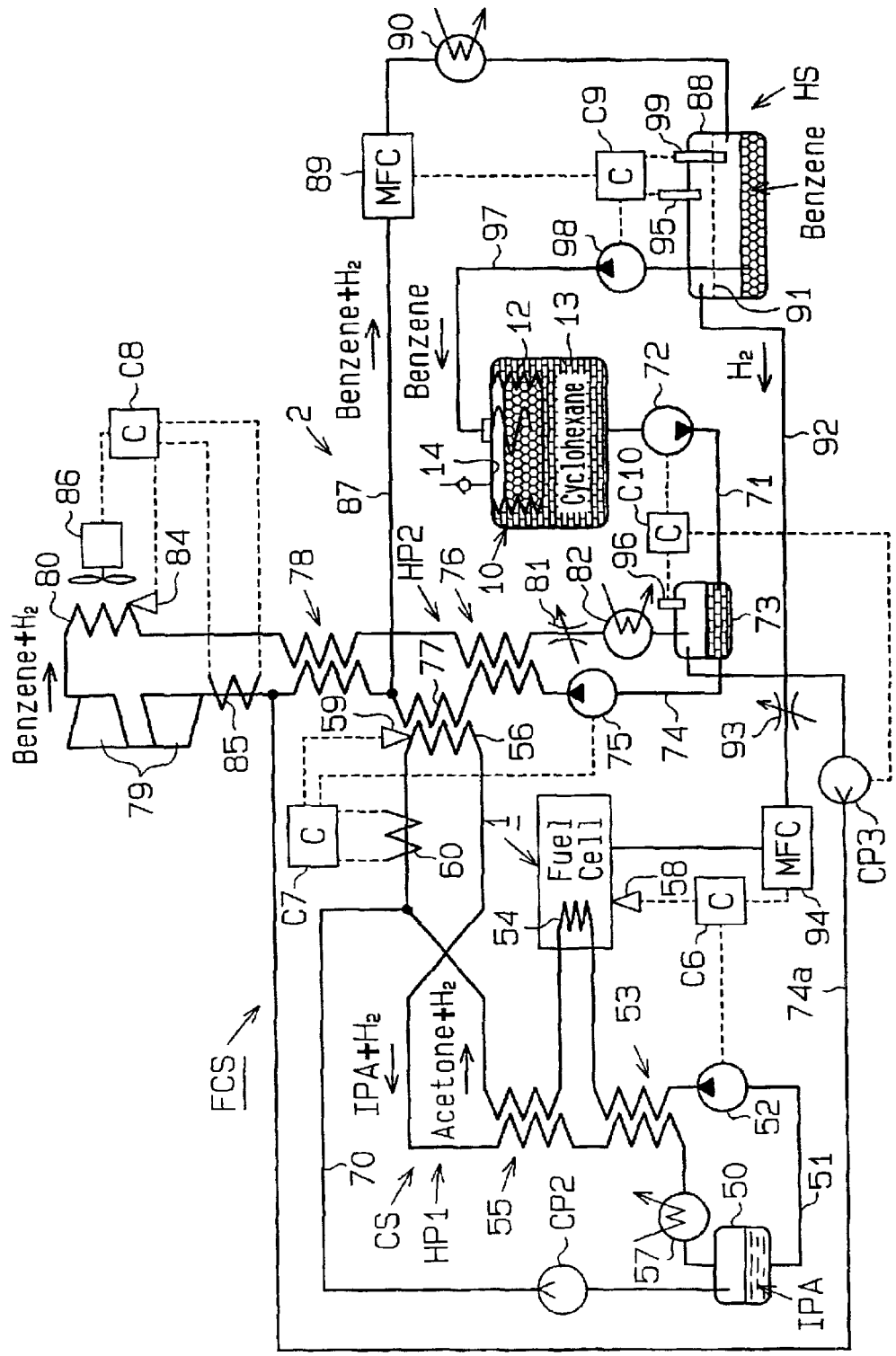
FIG. 4 is a schematic circuit diagram of a fuel cell system of the second embodiment of the present invention.

As shown in FIG. 4, the fuel cell system FCS includes the fuel cell 1 and the hydrogen supply system 2 for supplying hydrogen gas to the fuel cell 1. The cell cooling circuit CS has an IPA tank 50, a circulation pipe 51, an IPA pump 52 provided in the circulation pipe 51, a heat exchanger 53, a dehydrogenation reactor (endothermic reactor) 54, a heat exchanger 55, a hydrogenation reactor (exothermic reactor) 56, and a condenser 57. The inlet and outlet of the IPA tank 50 are connected to the circulation pipe 51 through the inner portion of the fuel cell 1. A dehydrogenation reactor 54 is incorporated into the fuel cell 1. The cell cooling circuit CS constitutes an IPA/acetone-type low-temperature chemical heat pump HP1, the basic circuit of which is the same as that of the IPA/acetone-type chemical heat pump of the first embodiment. The catalyst, which can be used in the dehydrogenation reactor 54 and the hydrogenation reactor 56, is the same as that in the first embodiment.

A cell temperature sensor 58 detects the temperature of the fuel cell 1 and transmits the temperature information to a cell controller C6. After the temperature of the fuel cell 1 reaches the operation temperature, the cell controller C6 operates the pump 52. A reaction temperature sensor 59 measures the temperature of the hydrogenation reactor 56 and transmits the information to a controller C7. The controller C7 controls a heater 60 to adjust the internal temperature of the hydrogenation reactor 56 to the hydrogenation reaction temperature (about 200° C.).

Figure 5:
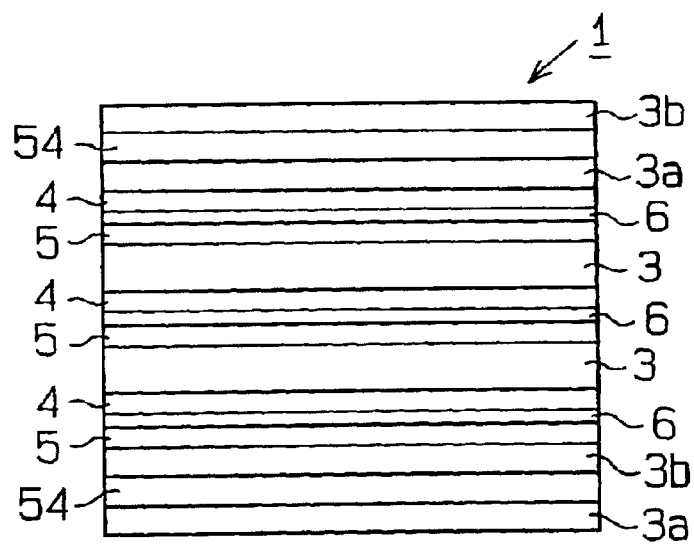
FIG. 5 is a schematic side view of a unit cell of a fuel cell.

FIG. 5 shows the fuel cell 1, which incorporates the dehydrogenation reactor 54. The fuel cell 1 has a structure in which the separators 3, the electrodes 4, 5, the electrolyte membrane 6 and the dehydrogenation reactors 54 are stacked on one another. The dehydrogenation reactor 54 is located between a first part 3a, which is on the fuel side of the separator 3, and a second part 3b, which is on the air side of the separator 3.

Figure 6:
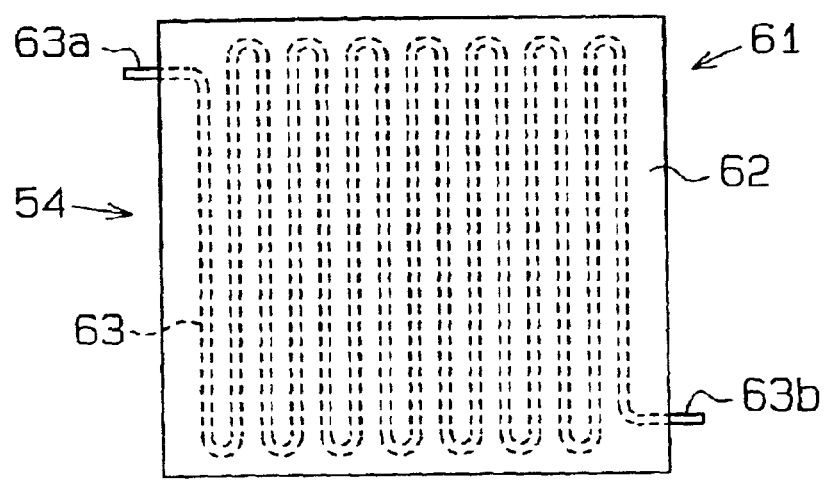
FIG. 6 is a schematic top view of a dehydrogenation reactor.

As the dehydrogenation reactor 54, for example, a tube-type cooling plate 61 shown in FIG. 6 is used. The cooling plate 61 is a press-molded article of metal, such as aluminum or the like. In the inner portion of a substrate 62, a tube 63 is arranged to meander. Both ends of the tube 63 are positioned at the exterior of the substrate 62 and function as a fuel inlet 63a and a fuel outlet 63b. In the tube 63, a catalyst for the dehydrogenation reaction is placed. When the cooling plate 61 is placed between the first and second parts 3a, 3b, the tube 63, which serves as a reaction path, passes through the inner portion of the separator 3.

Figure 7:
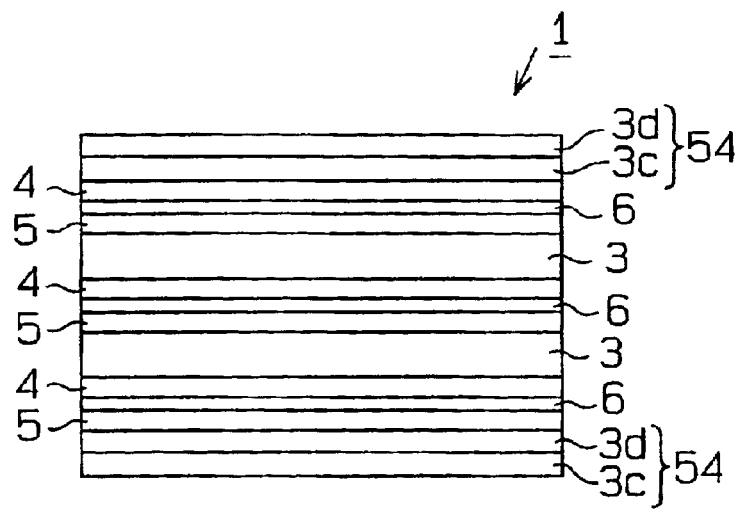
FIG. 7 is a schematic side view of a unit cell of another fuel cell.

FIG. 7 shows another fuel cell 1 that incorporates the dehydrogenation reactor 54. The dehydrogenation reactor 54 includes first and second different separator parts 3c, 3d. The dehydrogenation reactor 54 also functions as the separator 3.

Figure 8:
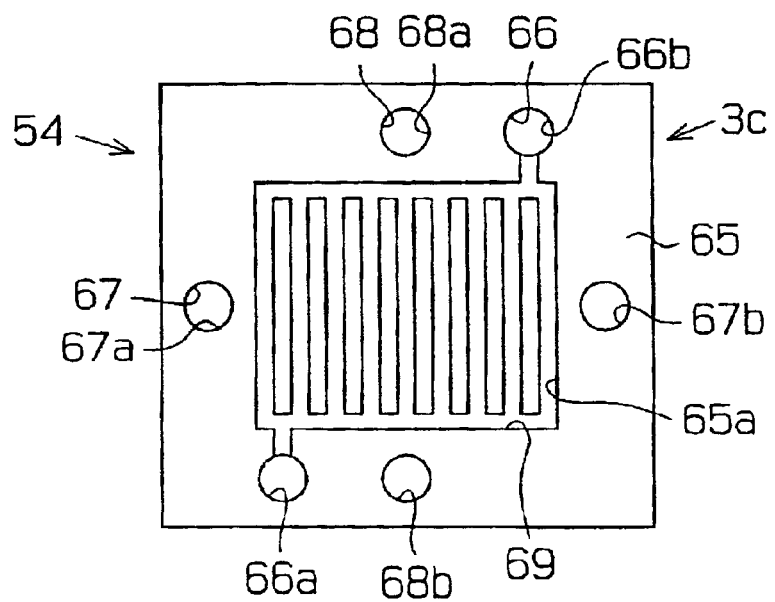
FIG. 8 is a diagrammatic top view of separator parts constituting a dehydrogenation reactor.

FIG. 8 is a top view of the first separator part 3c. The first separator part 3c is formed from a substrate 65 made of, for example, carbon. Three flow paths, i.e., a fuel flow path 66, a hydrogen flow path 67 and an air flow path 68, are formed in the margin area of the substrate 65 and are perpendicular to the plane of the substrate 65. In the unit cell 1a in FIG. 2, the margin area is not shown. In the surface of the substrate 65, an inlet 66a and an outlet 66b of the fuel flow path 66, an inlet 67a and an outlet 67b of the hydrogen flow path 67, and an inlet 68a and an outlet 68b of the air flow path 68 are formed. Further, in the surface of the substrate 65, reaction grooves 65a, which have a lattice form and which communicate with the inlet 66a and the outlet 66b of the fuel flow path 66, are formed. The second separator part 3d, which is connected to the first separator part 3c, is similar to the first separator part 3c.

When the two separator parts 3c, 3d are combined, a reaction pipe 69 is defined by the reaction grooves 65a of the first separator part 3c and the reaction grooves 65a of the second separator part 3d. That is, the reaction pipe 69 is formed in the dehydrogenation reactor 54. A catalyst for the dehydrogenation reaction is placed in the reaction pipe 69. In the surface opposite to the surface in which the reaction grooves 65a are formed, a plurality of fuel grooves 3e and air grooves 3f, as shown in FIG. 2, are formed.

When the dehydrogenation reactor 54 is incorporated into the fuel cell 1, the three flow paths 66, 67, 68 pass through the fuel cell 1 in a manner similar to that of known fuel cells. Hydrogen gas is supplied to the fuel electrode 4 through the hydrogen flow path 67, and air is supplied to the air electrode 5 through the air flow path 68. In addition, IPA is supplied to the reaction pipe 69 through the fuel flow path 66.

Any separator 3 of FIGS. 5 and 7 may be replaced by a dehydrogenation reactor 54, or all the separators 3 may be replaced by dehydrogenation reactors 54.

An IPA pipe 70 connects the IPA tank 50 and the circulation pipe 51 upstream of the hydrogenation reactor 56. The IPA pipe 70 is provided with a compressor CP2. An unillustrated pressure sensor detects the pressure in the IPA tank 50 and transmits the information to the cell controller C6. The cell controller C6 controls the compressor CP2 so that the pressure in the IPA tank 50 does not exceed a predetermined value.

The hydrogen supply system 2 is explained below.

The hydrogen supply system 2 includes a cyclohexane/benzene-type second chemical heat pump HP2 and a hydrogen separation circuit HS for separating pure hydrogen from the hydrogen/benzene mixed gas that results from the dehydrogenation reaction.

The fuel tank 10 has the same structure as that in the first embodiment and includes the container 12. The tank 10 is partitioned by the container 12 into two chambers, i.e., the fuel chamber 13 and the recovery chamber 14.

As shown in the formula below, cyclohexane $C_6H_{12}$ which is a fuel is separated into benzene $C_6H_6$ and hydrogen $H_2$ by the dehydrogenation reaction.

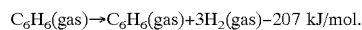

This dehydrogenation reaction is an endothermic reaction which proceeds at about 200° C.

In addition, the hydrogenation reaction of benzene is represented by the following formula:

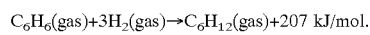

This hydrogenation reaction is an exothermic reaction which proceeds at about 350° C.

The cyclohexane/benzene-type chemical heat pump HP2 uses the dehydrogenation and hydrogenation reactions. A fuel feed pipe 71 connects the fuel chamber 13 and an auxiliary tank 73. The cyclohexane liquid in the fuel chamber 13 is fed to the auxiliary tank 73 by a fuel feed pump 72 provided in the fuel feed pipe 71. The second chemical heat pump HP2 includes the auxiliary tank 73, a circulation pipe 74, which has an inlet and an outlet at the auxiliary tank 73, a circulation pump 75, which is provided in the circulation pipe 74, a low-temperature heat exchanger 76, a dehydrogenation reactor 77, a high-temperature heat exchanger 78, two compressors 79, a hydrogenation reactor 80, a reducing valve 81, and a condenser 82.

A catalyst is placed in each of the dehydrogenation reactor 77 and the hydrogenation reactor 80. For example, platinum carried on alumina can be used as a catalyst. In the hydrogenation reactor 80, an equilibrium mixture of cyclohexane gas, benzene gas and hydrogen gas is obtained by the hydrogenation reaction (at about 350° C.) of benzene. The heat of the hydrogenation reactor 80 is used for preheating the benzene-hydrogen mixed gas in the high-temperature heat exchanger 78 and for preheating the cyclohexane in the low-temperature heat exchanger 76.

The heat (heat discharged) by an IPA/acetone-type low-temperature chemical heat pump HP1 that cools the fuel cell 1 is used as a heat source of the endothermic reaction that occurs in the dehydrogenation reactor 77. The hydrogenation reactor (exothermic reactor) 56 in the low-temperature chemical heat pump HP1 and the dehydrogenation reactor 77 form a heat exchanger. The endothermic reaction in the dehydrogenation reactor 77 proceeds at about 200° C. using heat from the low-temperature chemical heat pump HP1. A controller C7 controls the heater 60 based on the value detected by the reaction temperature sensor 59 to adjust the internal temperature of the dehydrogenation reactor 77 to the dehydrogenation reaction temperature (about 200° C.). A heater for heating the dehydrogenation reactor 77 may be used. As the heat exchanger formed by the hydrogenation reactor 56 and the dehydrogenation reactor 77, for example, a plate-type catalyst reactor is used.

The two compressors 79 compress hydrogen gas and benzene gas to be led to the hydrogenation reactor 80 to, for example, about 20 atm. A controller C8 controls a heater 85 and a cooling fan 86 based on the signal detected by a temperature sensor 84 in the hydrogenation reactor 80. Thus, the internal temperature of the hydrogenation reactor 80 is adjusted to about 350° C. The hydrogenation reactor 80 and the cooling fan 86 serve as a heat exhausting apparatus.

The equilibrium mixture of cyclohexane, hydrogen and benzene is cooled by the high-temperature heat exchanger 78 and the low-temperature heat exchanger 76 and evacuated by the reducing valve 81. Cyclohexane (boiling point: 81° C.) and benzene (boiling point: 80° C.) in the equilibrium mixture are liquefied in the condenser 82. Then, the partially liquefied equilibrium mixture returns to the auxiliary tank 73.

In the circulation pipe 74, a branch pipe 87 connects a point between the dehydrogenation reactor 77 and the high-temperature heat exchanger 78 to a gas-liquid separator 88. The branch pipe 87 is provided with a flow rate control valve (MFC) 89 and a condenser 90. Some of the hydrogen gas and benzene gas resulting from the dehydrogenation reaction of cyclohexane flows through the branch pipe 87. The benzene gas (boiling point: 80° C.) is liquefied in the condenser 90. Then, the resultant benzene liquid is recovered and stored in the gas-liquid separator 88.

The gas-liquid separator 88 is partitioned by a hydrogen separation membrane (hydrogen permeable membrane) 91 into two chambers. The fuel cell 1 is connected through a hydrogen supply pipe 92 to the gas-liquid separator 88 at the downstream side of the hydrogen separation membrane 91, i.e., the upper side of the gas-liquid separator 88 shown in FIG. 4. The pure hydrogen, which has passed through the hydrogen separation membrane 91, is supplied to the fuel cell 1 from the gas-liquid separator 88. The hydrogen supply pipe 92 is provided with a reducing valve 93 and a hydrogen flow rate control valve (MFC) 94. When power is consumed by the external load and the controller C6 determines that it is necessary to generate power, the opening of the hydrogen flow rate control valve 94 is changed according to the amount of the power required, and hydrogen gas is supplied to the fuel cell 1 at a flow rate according to the amount of the power required. The reducing valve 93 reduces the pressure of hydrogen in the hydrogen supply pipe 92 at a position upstream of the hydrogen flow rate control valve 94. The pipes 87, 92, 97, the condenser 90, the gas-liquid separator 88, the hydrogen separation membrane 91 and a benzene recovery pump 98 serve as a gas-liquid separating apparatus.

A hydrogen pressure sensor 95 detects the pressure of hydrogen gas in the gas-liquid separator 88 and transmits the information to a controller C9. The controller C9 controls the flow rate control valve 89 so that hydrogen gas at the predetermined pressure or higher is always stored in the gas-liquid separator 88. The amount of the liquid, which is mainly cyclohexane, in the auxiliary tank 73 is reduced by the amount corresponding to the total amount of benzene gas and hydrogen gas discharged from the second heat pump HP2 by opening the flow rate control valve 89. A level sensor 96 detects the level in the auxiliary tank 73, and transmits the information to a controller C10. When the level in the auxiliary tank 73 becomes lower than the predetermined level, the controller C10 drives the pump 72 to supply cyclohexane to the auxiliary tank 73 from the fuel chamber 13.

The benzene recovery pipe 97 connects the gas-liquid separator 88 and the recovery chamber 14. The benzene recovery pump 98 is provided on the benzene recovery pipe 97, and the gas-liquid separator 88 is provided with a level sensor 99 for detecting the level of benzene liquid. The controller C9 drives the benzene recovery pump 98 to feed benzene in the gas-liquid separator 88 to the recovery chamber 14 based on the signal detected by the level sensor 99 so that the amount of benzene liquid in the gas-liquid separator 88 does not exceed the predetermined value.

A bypass pipe 74a connects the auxiliary tank 73 and the circulation pipe 74 at location upstream of the hydrogenation reactor 80. The bypass pipe 74a is provided with a bypass compressor CP3. The auxiliary tank 73 is provided with a pressure sensor (not shown). The bypass compressor CP3 is driven by the controller C10 so that the pressure in the auxiliary tank 73 does not exceed the predetermined value.

The operation of the fuel cell system FCS is as follows.

When power is consumed by an external load, such as a vehicle or household appliances, connected to the fuel cell system FCS, the hydrogen flow rate control valve 94 is first opened according to the amount of the power required. Thus, pure hydrogen is supplied to the fuel electrode of the fuel cell 1 from the gas-liquid separator 88 at a flow rate according to the amount of the power required while air is supplied to the air electrode from the air supply apparatus, so that the fuel cell 1 generates power.

The cell controller C6 drives the IPA pump 52, based on the temperature detected by the cell temperature sensor 58, and feeds IPA to the dehydrogenation reactor 54 at a flow rate required for maintaining the temperature of the fuel cell 1 at the operation temperature. The fuel cell 1 is cooled by the endothermic reaction in the dehydrogenation reactor 54, so that the temperature of the fuel cell 1 is adjusted to the operation temperature.

The waste heat of the fuel cell 1 is transferred by the low-temperature chemical heat pump HP1. The waste heat is used to produce a temperature of about 200° C. at the hydrogenation reactor 56. Heat produced by the hydrogenation reactor 56 is transferred from the hydrogenation reactor 56 to the dehydrogenation reactor 77 and is used as a heat source for the dehydrogenation reaction of cyclohexane.

In the dehydrogenation reactor 77, the dehydrogenation reaction (endothermic reaction) of cyclohexane is conducted to form hydrogen and benzene. The mixed gas of the hydrogen and benzene formed is heated to about 350° C. In the hydrogenation reactor 80, cyclohexane is regenerated by the exothermic hydrogenation reaction of benzene. The equilibrium mixture of benzene, hydrogen and cyclohexane is cooled by the high-temperature heat exchanger 78 and the low-temperature heat exchanger 76 and is evacuated by the reducing valve 81. The mixture then returns to the auxiliary tank 73 through the condenser 82. In the auxiliary tank 73, liquid regenerated cyclohexane and unreacted benzene is stored.

When the pressure of hydrogen gas in the gas-liquid separator 88 fails and the flow rate control valve 89 is opened, some of the hydrogen-benzene mixed gas obtained by the dehydrogenation reaction of cyclohexane is fed to the gas-liquid separator 88 through the condenser 90. In the gas-liquid separator 88, the benzene liquid, which is liquefied in the condenser 90, is stored. The benzene liquid is recovered in the recovery chamber 14 from the gas-liquid separator 88 by the benzene recovery pump 98. Pure hydrogen gas, which is separated in the gas-liquid separator 88, is supplied to the fuel cell 1.

According to the second embodiment, in addition to the above advantages (1) to (4), (6) and (7) of the first embodiment, the following advantages are obtained.

(8) The heat transferred from the fuel cell 1 is first used to produce a temperature of about 200° C. by the low-temperature chemical heat pump HP1. Then the second chemical heat pump HP2 produces a temperature of about 350° C. to improve the removal of heat. The difference between the temperature (about 350° C.) of the hydrogenation reactor 80, which functions as a radiator, and the temperature (for example, 30 to 50° C.) around the hydrogenation reactor 80 is large. Therefore, the hydrogenation reactor 80 is more efficiently cooled by the cooling fan 86. Since a smaller hydrogenation reactor 80 can be used, the size of the fuel cell system FCS can be reduced. In addition, the dehydrogenation reactor 54 which is compact and has a function of the separator 3 is used. Therefore, the fuel cell 1 is of a relatively small size. Further, since the dehydrogenation reactor 54 is incorporated into the fuel cell 1, the dehydrogenation reactor 54 can efficiently absorb the heat of the fuel cell 1.

(9) Cyclohexane produces hydrogen more efficiently than IPA. Therefore, when the fuel cell system FCS is mounted on a vehicle, the size of the fuel tank 10 can be reduced, thus, the size of the fuel cell system can be reduced.

Third Embodiment

Next, the fuel cell system FCS of the third embodiment of the present invention will be described with reference to FIG. 9. In the third embodiment, methylcyclohexane $C_6H_{11}CH_3$ is used as fuel. As shown in the formula below, methylcyclohexane is separated into toluene $C_6H_5CH_3$ and hydrogen $H_2$ by the dehydrogenation reaction.

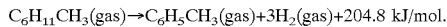

This dehydrogenation reaction is an endothermic reaction that proceeds at about 200° C.

Toluene forms methylcyclohexane by the hydrogenation reaction.

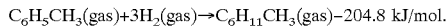

This hydrogenation reaction is an exothermic reaction that proceeds at about 350° C.

The fuel cell system FCS of the third embodiment has a two-stage chemical heat pump similar to that of the second embodiment. Specifically, the fuel cell system FCS has the IPA/acetone-type low-temperature chemical heat pump HP1 for cooling the fuel cell and the methylcyclohexane/toluene/ $H_2$-type (hereinafter, simply referred to as "methylcyclohexane/toluene-type") high-temperature chemical heat pump HP2 for forming hydrogen. The heat (heat discharged) of the low-temperature chemical heat pump HP1 is heated by the high-temperature chemical heat pump HP2 and used for generating power.

The low-temperature chemical heat pump HP1 is the same as that in the second embodiment. The waste heat of the fuel cell 1 is transferred by the low-temperature chemical heat pump HP1 and is used as a heat source for the dehydrogenation reaction of methylcyclohexane in the high-temperature chemical heat pump HP2.

The fuel cell cooling circuit CS is the same as that in the second embodiment. The dehydrogenation reactor 54 shown in any one of FIGS. 5 to 8 is incorporated into the fuel cell 1.

After the temperature of the fuel cell 1 reaches the operation temperature, the cell controller C6 drives the IPA pump 52 based on the value detected by the cell temperature sensor 58. Further, the controller C7 controls the heater 60 so that the internal temperature of the hydrogenation reactor 56 becomes about 200° C. The IPA pipe 70 connects the IPA tank 50 and the circulation pipe 51 at the upstream portion of the hydrogenation reactor 56. The cell controller C6 controls the compressor CP2 provided on the IPA pipe 70 so that the pressure in the IPA tank 50 does not exceed the predetermined value.

The hydrogen supply system 2 is explained below.

The hydrogen supply system 2 comprises the methylcyclohexane/toluene-type high-temperature chemical heat pump HP2 and the hydrogen separation circuit HS for separating pure hydrogen from the hydrogen/toluene mixed gas obtained after the dehydrogenation reaction.

The fuel tank 10 has the same structure as that in the first embodiment. Methylcyclohexane in the fuel chamber 13 is fed from the refueling inlet, whereas toluene in the recovery chamber 14 is discharged from the outlet. Methylcyclohexane, which is the fuel, and toluene, which is the by-product, are liquids at ordinary temperatures.

A fuel pipe 100 connects the fuel chamber 13 and an auxiliary tank 101. Methylcyclohexane liquid is fed from the fuel chamber 13 to the auxiliary tank 101 by the fuel pump 102 provided on the fuel pipe 100. The high-temperature chemical heat pump HP2 includes a dehydrogenation reaction circuit and a hydrogenation reaction circuit.

The dehydrogenation reaction circuit includes the auxiliary tank 101, a dehydrogenation pipe 103, a dehydrogenation pump 104, which is provided on the dehydrogenation pipe 103, a dehydrogenation heat exchanger 105, a dehydrogenation reactor 106, and a condenser 107. The dehydrogenation pipe 103 connects the auxiliary tank 101 and a gas-liquid separator 108. In the dehydrogenation reactor 106, the dehydrogenation reaction of methylcyclohexane proceeds at about 200° C. using heat from the low-temperature chemical heat pump HP1 as a heat source, so that a toluene-hydrogen mixed gas is formed. That is, heat is transferred from the hydrogenation reactor (exothermic reactor) 56 of the low-temperature chemical heat pump HP1 to the dehydrogenation reactor 106. The controller C7 controls the heater 60 to adjust the temperature of the dehydrogenation reactor 106 to about 200° C. The heat of the toluene-hydrogen mixed gas is used for preheating the methylcyclohexane in the heat exchanger 105. In the condenser 107, toluene (boiling point: 111° C.) in the toluene-hydrogen mixed gas is liquefied and stored in the gas-liquid separator 108. In the dehydrogenation reactor 106, a catalyst, for example, platinum carried on alumina, is located.

Gas containing hydrogen in the gas-liquid separator 108 is led to the auxiliary tank 101 through a pipe 109. The pipe 109 is provided with a condenser 110.

The auxiliary tank 101 is provided with a hydrogen separation membrane 111, and only hydrogen gas is present in the auxiliary tank 101 on a downstream side of the hydrogen separation membrane 111. Pure hydrogen gas is supplied to the fuel cell 1 through a hydrogen supply pipe 112. The hydrogen supply pipe 112 is provided with a reducing valve 113 and a flow rate control valve (MFC) 114. When the cell controller C6 determines that it is necessary to generate power, the flow rate control valve 114 is opened so that hydrogen is supplied to the fuel cell at a flow rate according to the amount of the power required. The reducing valve 113 reduces the pressure of the hydrogen gas.

On the other hand, the hydrogenation reaction circuit includes the gas-liquid separator 108, a circulation circuit 115 having an inlet and an outlet at the gas-liquid separator 108, a pump 116 provided on the circulation circuit 115, a hydrogenation reactor 117, a heat exchanger 118, a reducing valve 119, and a condenser 120. A hydrogenation pipe 121 connects a point in the circulation circuit 115 between the pump 116 and the hydrogenation reactor 117 with the hydrogen supply pipe 112. The hydrogenation pipe 121 is provided with two hydrogen gas compressors 122. The two hydrogen gas compressors 122 compress hydrogen to, for example, about 20 atm. and supply the compressed hydrogen gas to a position upstream of the hydrogenation reactor 117. The temperature of the hydrogenation reactor 117 is detected by a reaction temperature sensor 123. A controller C11 controls a heater 124 provided on the circulation circuit 115 to maintain the internal temperature of the hydrogenation reactor 117 at about 350° C.

In the hydrogenation reactor 117, a catalyst, for example, platinum carried on alumina is located. In the hydrogenation reactor 117, methylcyclohexane is regenerated by the hydrogenation reaction of toluene, so that an equilibrium mixture of methylcyclohexane, toluene and hydrogen is obtained. The equilibrium mixture is cooled by the heat exchanger 118. Specifically, the heat of the equilibrium mixture is used in the heat exchanger 118 for heating toluene in the circulation circuit 115. Then, the equilibrium mixture is evacuated by the reducing valve 119, and toluene (boiling point: 111° C.) is liquefied in the condenser 120 and returns to the gas-liquid separator 108.

The unreacted toluene is liquefied in the gas-liquid separator 108. In the gas-liquid separator 108, methylcyclohexane gas (boiling point: 101° C.) is not liquefied. However, the methylcyclohexane gas is liquefied in the condenser 110 provided on the pipe 109 and is recovered in the auxiliary tank 101.

A level sensor 125, which is provided on the auxiliary tank 101, transmits the information about the level of methylcyclohexane liquid to a controller C12. The controller C12 controls the fuel pump 102 so that methylcyclohexane liquid in the predetermined amount (at the predetermined level) or more is always stored in the auxiliary tank 101.

A toluene level sensor 127 detects the amount of toluene liquid in the gas-liquid separator 108 and transmits the information to a controller C13. When the amount of the toluene liquid exceeds a predetermined amount, the controller C13 drives a drain pump 128. Thus, the toluene liquid in the gas-liquid separator 108 is recovered in the recovery chamber 14 through a drain pipe 126. The condensers 110, 120, the gas-liquid separator 108, the auxiliary tank 101, the hydrogen separation membrane 111, the pipes 112, 126 and the drain pump 128 serve as a gas-liquid separation apparatus.

The heat of the hydrogenation reactor 117 is used as a heat source for a power generation circuit GS. The power generation circuit GS includes a water tank 130, a water circulation pipe 131, which has an inlet and an outlet at the water tank 130, a water pump 132 provided on the water circulation pipe 131, a steam generator (heat receiver) 133, an enclosed scroll extender 134 and a condenser 135, and a power generator 136 driven by the scroll extender 134. The water pump 132 is controlled by the controller C11 based on the signal detected by the temperature sensor 123 on the hydrogenation reactor 117. Heat is transferred from the hydrogenation reactor 117 to the steam generator 133. Steam is formed from water in the steam generator 133 using the heat of reaction in the hydrogenation reactor 117. The steam drives the scroll extender 134. Thus, the power generator 136 generates electric power and stores the electric power in a battery (not shown) for the fuel cell system FCS. The hydrogenation reactor 117, the water tank 130, the water circulation pipe 131, the water pump 132, the steam generator 133, the scroll extender 134, the condenser 135 and the power generator 136 serve as a heat exhausting apparatus and a power generating apparatus.

According to the third embodiment, in addition to the above advantages (1) to (4), (6) and (9), the following advantages are obtained.

(10) The heat of the fuel cell 1 is used as energy for generating power, thus improving the efficiency of power generation per unit of fuel. Since an enclosed scroll extender, which operates more efficiently than an open turbine, is used, it is possible to generate power efficiently at a wide-range of revolution rates.

Fourth Embodiment

In the fuel cell system FCS of the fourth embodiment, the heat obtained by burning the by-product of the dehydrogenation reaction is used as a heat source for the dehydrogenation reaction. The fuel cell 1 is cooled by cooling water.

As shown in FIG. 10, the fuel cell system FCS includes the fuel cell 1 and the hydrogen supply system 2. In the hydrogen supply system 2, IPA is used as fuel, and hydrogen is formed by the dehydrogenation reaction of IPA and supplied to the fuel cell 1 while acetone formed in the dehydrogenation reaction of IPA is recovered. The air supply system in the fuel cell 1 is not illustrated.

Figure 11A:
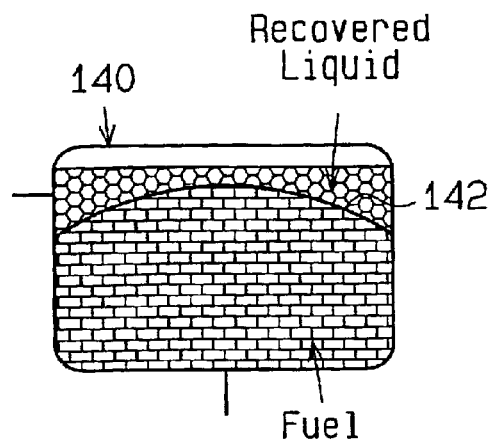
FIGS. 11a and 11b are sectional side elevations of a fuel tank.
Figure 11B:
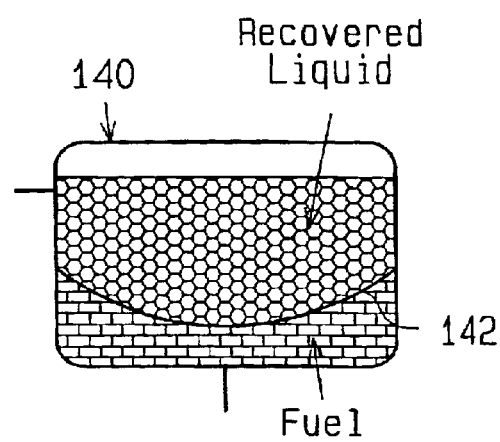

A fuel tank 140 has a membrane 142 as a movable partition and a hydrogen separation membrane 155. The fuel tank 140 is partitioned by the membrane 142 into the upper recovery chamber 14 and the lower fuel chamber 13. The material for the membrane 142 is preferably rubber that is not damaged by fuel. As shown in FIG. 11a, when the fuel tank 140 contains a large amount of fuel, the membrane 142 elastically deflects upwardly. Thus, the volume of the fuel chamber 13 is increased and the volume of the recovery chamber 14 is decreased. As shown in FIG. 11b, when the fuel tank 140 contains a small amount of fuel, the membrane 142 elastically deflects downwardly. Thus, the volume of the fuel chamber 13 is decreased and the volume of the recovery chamber 14 is increased. As mentioned above, the membrane 142 appropriately deflects depending on the proportion of the amount of the fuel in the fuel chamber 13 to the amount of the recovered liquid in the recovery chamber 14.

The hydrogen supply system 2 has the fuel tank 140, a fuel pipe 143 having an inlet connected to the fuel chamber 13 and an outlet connected to an IPA separator 147, an IPA pump 144 provided on the fuel pipe 143, a dehydrogenation reactor 145 and a condenser 146. The catalyst used in the dehydrogenation reactor 145 is the same as that in the first embodiment.

In the dehydrogenation reactor 145, hydrogen gas and acetone gas are formed by the dehydrogenation reaction of IPA. IPA (boiling point: 81° C.) is liquefied in the condenser 146, so that hydrogen gas, acetone gas and the unreacted IPA liquefied are led to the IPA separator 147. A recovered IPA feed pipe 148 connects the IPA separator 147 and a point in the fuel pipe 143 between the IPA pump 144 and the dehydrogenation reactor 145. A recovered IPA pump 149 provided on the recovered IPA feed pipe 148 is controlled by a controller C15. A level sensor 150 detects the level of IPA in the IPA separator 147 and transmits the information to a controller C16. When the level of IPA reaches a predetermined level, the controller C15 drives the recovered IPA pump 149 instead of the IPA pump 144. Thus, the IPA in the IPA separator 147 is fed to the dehydrogenation reactor 145.

An acetone separation pipe 151 connects the IPA separator 147 and an acetone separator 152. The acetone separation pipe 151 is provided with a condenser 153. The gas in the IPA separator 147 is led to the condenser 153 through the acetone separation pipe 151. In the condenser 153, acetone (boiling point: 56° C.) is liquefied. The resultant acetone liquid is stored in the acetone separator 152. The gas in the acetone separator 152 is returned to the recovery chamber 14 through a return pipe 154. When the level of acetone liquid in the acetone separator 152 reaches a predetermined level, the acetone liquid is recovered in the recovery chamber 14 through the return pipe 154.

The recovery chamber 14 is partitioned by the hydrogen separation membrane 155 into two chambers. A hydrogen supply pipe 156 connects the recovery chamber 14, at a location on the downstream side of the hydrogen separation membrane 155, to the fuel cell 1. The hydrogen supply pipe 156 is provided with a reducing valve 157 and a flow control valve 158. When the controller C15 determines that it is necessary to generate power, the flow rate control valve 158 is opened depending on the amount of the power required. Thus, hydrogen is supplied to the fuel cell 1 at a flow rate according to the amount of the power required. The reducing valve 157 reduces the pressure of the hydrogen to be supplied to the flow control valve 158.

The pressure of hydrogen gas in the recovery chamber 14 is detected by a pressure sensor 159. When the pressure of hydrogen gas in the recovery chamber 14 becomes lower than a predetermined value, the controller C15 drives the pump 144 or the pump 149 to feed IPA to the dehydrogenation reactor 145. The fuel tank 140, the condensers 146, 153, the separators 147, 152, the pipes 143, 151, 154 and the hydrogen separation membrane 155 serve as a gas-liquid separation apparatus.

An acetone pipe 160 connects the recovery chamber 14 and a burner 161. The acetone pipe 160 is provided with an acetone pump 162. The burner 161 is positioned in the vicinity of the dehydrogenation reactor 145. When the pressure in hydrogen in the recovery chamber 14 reaches the predetermined value or less for the pump 144 (149), the controller C15 drives the acetone pump 162 to ignite the burner 161. The internal temperature of the dehydrogenation reactor 145 is detected by a temperature sensor 163. The controller C15 controls the acetone pump 162 and the acetone burner 161 so that the temperature of the dehydrogenation reactor 145 becomes about 80° C. (dehydrogenation reaction temperature). A portion of the recovered liquid (acetone) is used for heating the dehydrogenation reactor 145. The heat of combustion in the acetone burner 161 may be used as an auxiliary heat source for the fuel cell system FCS when the fuel cell system FCS is at a low temperature (for example, at the time when the operation is started).

In the fourth embodiment, as a fuel, cyclohexane or methylcyclohexane can be used instead of IPA. In such a case, the controller C15 controls the burner 161 so that the dehydrogenation reaction temperature is appropriately maintained depending on the type of the fuel used.

In the fourth embodiment, $CO_2$ is discharged to the atmosphere, but the amount of $CO_2$ discharged is smaller than that in the conventional methanol reformation method. Excluding this point, the above advantages (1) to (4) are obtained. In addition, the following advantages are also obtained.

(10) The heat obtained by burning the recovered liquid is used as a heat source for the dehydrogenation reactor 145, thus, the recovered liquid is effectively used. Further, for example, when the fuel cell system FCS is used for a vehicle, the weight of the fuel cell system FCS is reduced by the weight of the recovered liquid consumed, thus increasing the vehicle range.

Fifth Embodiment

The fifth embodiment is similar to the third embodiment, and power is generated using the Seebeck effect, which uses the waste heat of the fuel cell 1.

Figure 12:
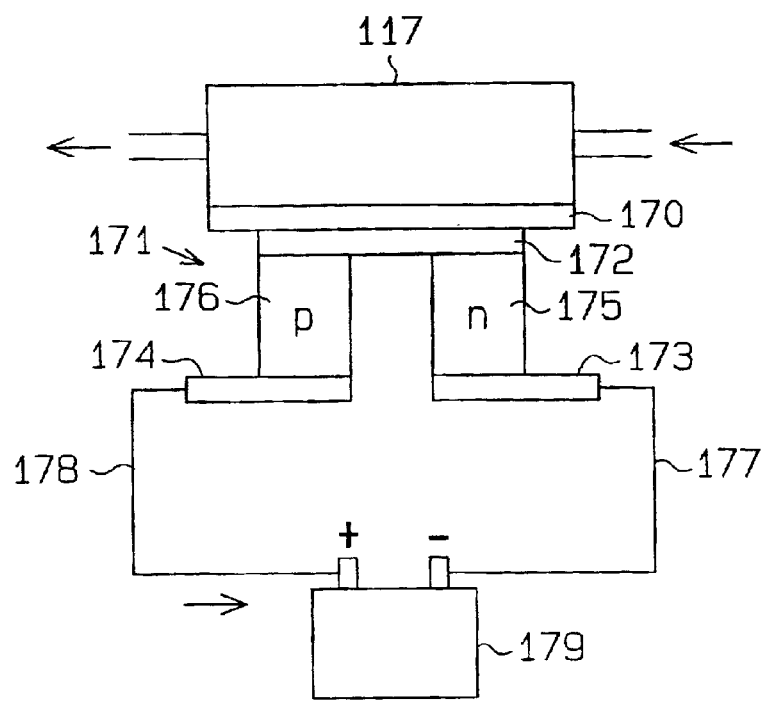
FIG. 12 is a diagrammatic side view showing a thermo electric generating element of the fifth embodiment of the present invention.

As shown in FIG. 12, a thermo electric generating element 171 is attached to the hydrogenation reactor 117 in the high-temperature chemical heat pump HP2 through a heat transfer plate 170. The thermo electric generating element 171 has a high-temperature electrode 172, two low-temperature electrodes 173, 174, an n-type semiconductor 175 located between the high-temperature electrode 172 and the low-temperature electrode 173, and a p-type semiconductor 176 located between the high-temperature electrode 172 and the low-temperature electrode 174. The low-temperature electrodes 173, 174 are respectively connected to the negative electrode and the positive electrode of battery 179 through wirings 177, 178.

The heat of the hydrogenation reactor 117 heats the high-temperature electrode 172 through the heat transfer plate 170. Thus, a difference in temperature between the high-temperature electrode 172 and the low-temperature electrodes 173, 174 is produced. The battery 179 is charged with the electromotive force generated by this temperature difference.

Thus, according to the fifth embodiment, in addition to the above advantages of the third embodiment, the following advantages are obtained.

(11) By using the thermo electric generating element 171, it is possible to generate power satisfactorily, although the heat discharge temperature is lower than that required for steam power generation.

Sixth Embodiment

Figure 13:
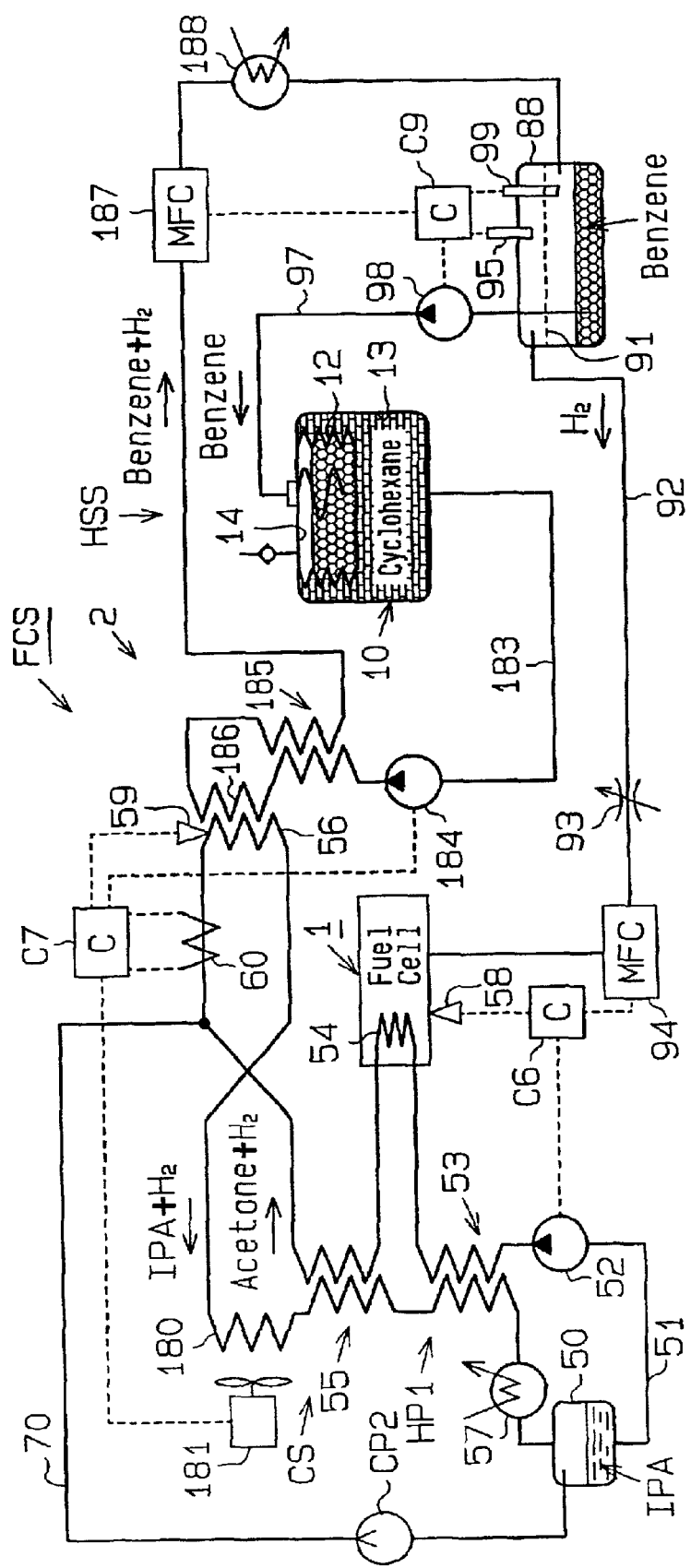
FIG. 13 is a schematic circuit diagram of a fuel cell system of the sixth embodiment of the present invention.

The sixth embodiment shown in FIG. 13 is the improvement of the second embodiment. In the sixth embodiment, a one-stage chemical heat pump is used. In the hydrogen supply system 2, no hydrogenation reaction is conducted.

The hydrogen supply system 2 comprises a cell cooling circuit CS and a hydrogen supply circuit HSS. The cell cooling circuit CS has a IPA/acetone-type low-temperature chemical heat pump HP1 similar to that of the second embodiment. In FIG. 13, a radiator is located downstream of the hydrogenation reactor. The cell cooling circuit CS has an IPA tank 50, a circulation pipe 51, which has an inlet and an outlet at the IPA tank 50, an IPA pump 52, which is provided in the circulation pipe 51, a heat exchanger 53, a dehydrogenation reactor (endothermic reactor) 54, a heat exchanger 55, a hydrogenation reactor (exothermic reactor) 56, a radiator 180, and a condenser 57. The circulation pipe 51 passes through the inner portion of the fuel cell 1. The fuel cell 1 incorporates the dehydrogenation reactor 54. A cooling fan 181 is provided in the vicinity of the radiator 180. Instead of the heat discharge portion (hydrogenation reactor 80) of the high-temperature chemical heat pump HP2 in the second embodiment, the radiator 180 and the cooling fan 181 are employed in the sixth embodiment.

The cell temperature sensor 58 detects the temperature of the fuel cell 1. The cell controller C6 drives the IPA pump 52 after the temperature of the fuel cell 1 has reached the operation temperature. The reaction temperature sensor 59 detects the temperature of the hydrogenation reactor 56. The controller C7 controls the heater 60 so that the temperature of the reaction temperature sensor 59 is maintained at the hydrogenation reaction temperature (about 200° C.). The pipe 70 connects the IPA tank 50 and the circulation pipe 51 at a portion thereof upstream of the hydrogenation reactor 56. The compressor CP2 provided on the pipe 70 is driven by the cell controller C6 so that the pressure in the IPA tank 50 does not exceed a predetermined value.

A hydrogen supply (formation) circuit HSS is explained below.

The hydrogen supply circuit HSS uses the dehydrogenation reaction of cyclohexane, which is differ from the second embodiment.

The fuel chamber 13 is connected to the gas-liquid separator 88 through a pipe 183. The pipe 183 is provided with a cyclohexane pump 184, a heat exchanger 185, a dehydrogenation reactor 186, a flow rate control valve (MFC) 187 and a benzene condenser 188. Heat is transferred between the dehydrogenation reactor 186 and the hydrogenation reactor 56. A catalyst is placed in the dehydrogenation reactor 186. The catalyst is preferably platinum carried on alumina. In the dehydrogenation reactor 186, benzene gas and hydrogen gas are formed by the dehydrogenation reaction of cyclohexane. The heat of the dehydrogenation reactor 186 is used for preheating cyclohexane in the heat exchanger 185.

When benzene gas and hydrogen gas flow through the benzene condenser 188, benzene (boiling point: 80° C.) is liquefied. Thus, benzene liquid and hydrogen gas are separately contained in the gas-liquid separator 88.

The hydrogen separation membrane 91 located in the gas-liquid separator 88 allows hydrogen gas to permeate therethrough. Thus, pure hydrogen gas is supplied to the fuel cell 1 through the hydrogen supply pipe 92 connected to the gas-liquid separator 88 at a location downstream of the hydrogen separation membrane 91. The hydrogen supply pipe 92 is provided with the reducing valve 93 and the hydrogen flow rate control valve (MFC) 94. The reducing valve 93 reduces the pressure of hydrogen gas in the hydrogen supply pipe 92 at a portion thereof upstream of the hydrogen flow rate control valve 94. When receiving instructions for generating power, the cell controller C6 controls the opening of the hydrogen flow rate control valve 94 according to the amount of the power required. Thus, hydrogen gas is supplied to the fuel cell 1 at a flow rate according to the amount of the power required.

The hydrogen pressure sensor 95 detects the pressure of hydrogen gas in the gas-liquid separator 88. The controller C9 controls the flow rate control valve 187 so that hydrogen at the predetermined pressure or higher is always stored in the gas-liquid separator 88. The benzene recovery pipe 97 connects the gas-liquid separator 88 and the recovery chamber 14. The benzene recovery pipe 97 is provided with the benzene recovery pump 98. The gas-liquid separator 88 is provided with the level sensor 99 for detecting the level of benzene liquid, and the controller C9 drives the benzene recovery pump 98 to return benzene to the recovery chamber 14 so that the amount of benzene liquid in the gas-liquid separator 88 does not exceed the predetermined amount.

It is preferred that the cyclohexane pump 184 is driven substantially simultaneously with opening of the flow control valve 187. Thus, cyclohexane is supplied to the dehydrogenation reactor 186 by the cyclohexane pump 184 in an amount capable of forming hydrogen gas required for making up for the hydrogen gas flowing into the gas-liquid separator 88 depending on the opening size of the flow rate control valve 187. The gas-liquid separator 88, the benzene condenser 188, the pipes 92, 97 and the benzene recovery pump 98 serve as a gas-liquid separation apparatus.

According to the sixth embodiment, in addition to the above advantages (1) to (4) and (8), the following advantages are obtained.

(12) Since the gas at about 200° C. is cooled by the radiator 180, the efficiency of heat discharge in the sixth embodiment is excellent, as compared to that in the prior art in which cooling water at 80° C. is cooled. Therefore, the size of the radiator 180 can be reduced.

Seventh Embodiment

The seventh embodiment relates to a system for recycling fuel. That is, liquid recovered from the fuel cell system FCS mounted on an automobile 200 is reused.

Figure 14:
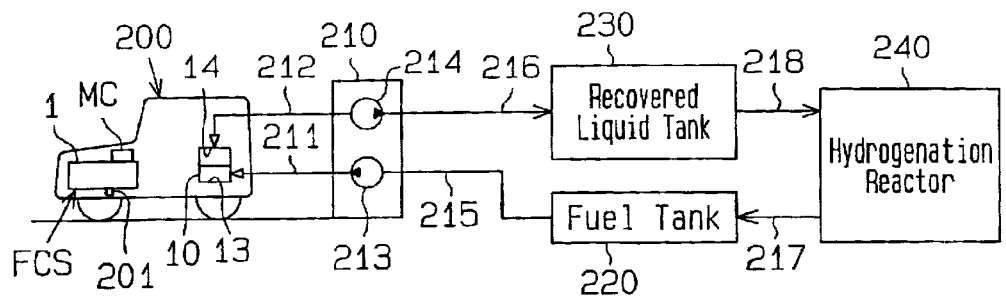
FIG. 14 is a diagrammatic view showing a system for recycling a fuel for a fuel cell system of the seventh embodiment of the present invention.

The automobile 200 shown in FIG. 14 runs by driving an electric motor (not shown) for running using the electric power generated by a fuel cell 1. In a recovery chamber 14 of a fuel tank 10, the recovered liquid formed by the dehydrogenation reaction of the fuel is recovered and stored.

The refueling place is provided with a refueling station 210, a fuel tank 220, a reaction mixture liquid tank 230 and a hydrogenation reaction apparatus 240. The hydrogenation reaction apparatus 240 hydrogenates the liquid recovered in the reaction mixture liquid tank 230 to regenerate the fuel, and supplies the regenerated fuel to the fuel tank 220. The hydrogenation reaction apparatus 240 is the same as the hydrogen supply system in the first to third embodiments. The hydrogenation reaction apparatus 240 may be provided on places other than the refueling place. For example, the hydrogenation reaction apparatus 240 provided on a far place and the tanks 220, 230 may be connected to each other through a pipeline.

When refueling at the refueling station 210, a refueling hose 211 and an oil discharging hose 212 are connected to the fuel tank 10 of the automobile 200. The fuel in the fuel tank 220 is supplied to the fuel chamber 13 by a fuel supply pump 213 through the refueling hose 211. The recovered liquid in the recovery chamber 14 is recovered into the reaction mixture liquid tank 230 by a recovery pump 214. The recovered liquid is hydrogenated in the hydrogenation reaction apparatus 240 and regenerated as a fuel. The regenerated fuel is passed through a pipe 217 and stored in the fuel tank 220.

According to the seventh embodiment, the following advantages are obtained.

(13) The automobile 200, which mounts the fuel cell system FCS, discharges no $CO_2$. Further, the hydrogenation reaction apparatus 240 also discharges no $CO_2$. Therefore, the fuel recycling system including the automobile 200 and the hydrogenation reaction apparatus 240 discharges no $CO_2$. It should be noted that, in the combination of the seventh embodiment and the fourth embodiment, a slight amount of $CO_2$ is discharged.

Eighth Embodiment

The eighth embodiment relates to a control method for preferably controlling the fuel cell system FCS in an automobile having mounted thereon the fuel cell system FCS of the first to third and fifth embodiments. As shown in the flow chart of FIG. 15, in the control method of the eighth embodiment, even when the automobile is stopped and it is not necessary to generate power, the hydrogen formation or the power generation is continued utilizing the heat inertia.

The fuel cell system FCS mounted on the automobile 200 is controlled by a control unit MC (shown in FIG. 14). The control unit MC has incorporated thereinto a microcomputer including a central processing unit (CPU) and a memory for storing the program data for the heat inertia operation control routine shown in FIG. 15. The control unit MC is electrically connected to a car speed sensor 201 (shown in FIG. 14). The control unit MC and the car speed sensor 201 serve as a heat inertia operation control apparatus.

In an operation state such that the start key of the automobile 200 is on, electric power is consumed in the electric circuit of automobile 200. When the consumption of electric power is detected, the control unit MC determines that it is necessary to generate power and sends to the fuel cell system FCS instructions for generating power. On the other hand, when the stop of running of the automobile 200 is detected from the signal of the car speed sensor 201, the control unit MC determines that there is no need to generate power. At that time, the CPU of the control unit MC implements the heat inertia operation control program shown in FIG. 15.

Figure 15:
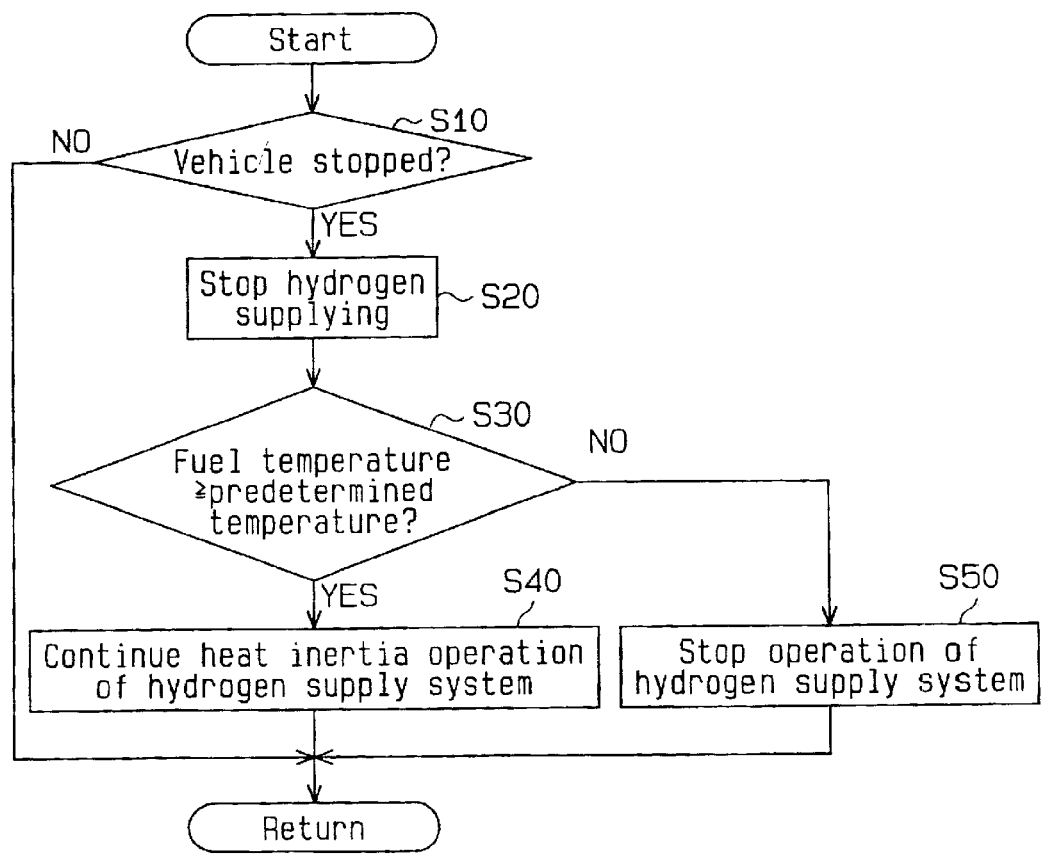
FIG. 15 is a flow chart showing a heat inertia operation control of the eighth embodiment of the present invention.

The heat inertia operation control shown in FIG. 15 is explained below.

First, in step S10, the control unit MC examines whether or not the automobile 200 is stopped. When the automobile 200 is not stopped, the routine in FIG. 15 is temporarily terminated. On the other hand, when the automobile 200 is stopped, the process goes to step S20.

In step S20, the control unit MC stops the supply of hydrogen to the fuel cell 1. Specifically, the control unit MC closes the hydrogen flow rate control valves (37, 94, 114, 158) and stops the temperature control of the fuel cell 1.

In step S30, the control unit MC examines whether or not the temperature of the fuel cell 1 is a predetermined temperature or higher. Specifically, based on the input signal of at least one sensor among the cell temperature sensor 58, the temperature sensor provided on the hydrogenation reactor in the fuel cell cooling system, and the temperature sensor for detecting the temperature of the dehydrogenation reactor in the hydrogen formation system, the control unit MC examines whether or not the heat of hydrogen formation, fuel regeneration and heat discharge power generation is in the available range. The predetermined temperature is the lower limit value of the available range. When the temperature of the fuel cell 1 is the predetermined value or higher, the process proceeds to step S40. On the other hand, when the temperature of the fuel cell 1 is lower than the predetermined value, the process proceeds to step S50. When the fuel cell system FCS has a multi-stage chemical heat pump, whether or not the chemical heat pump on the higher temperature side generates heat depends on the temperature of the waste heat of the fuel cell 1. Therefore, the temperature of the fuel cell 1 is examined. The value detected by the temperature sensor provided on the high-temperature chemical heat pump is used as an indirect index indicating the temperature of the fuel cell 1.

In step S40, the control unit MC allows the hydrogen supply system to continue the heat inertia operation. Specifically, in a state such that the power generation of the fuel cell 1 is stopped, the control unit MC controls the apparatuses including the pump for the fuel feed and the compressor for the hydrogen supply so that the hydrogen supply system, the fuel regeneration system and the heat discharge power generation system continue to operate.

When the temperature of the fuel cell 1 becomes lower than the predetermined value, the control unit MC stops the operation of the hydrogen supply system in step S50. It should be noted that, when it is necessary to cool the fuel cell 1, the operation of at least cooling circuit is continued.

According to the eighth embodiment, the following advantages are obtained.

(14) When the running of the automobile 200 is stopped and the power generation is stopped, heat inertia is effectively utilized to form hydrogen and/or a fuel. Thus, the efficiency of power generation of the fuel cell system FCS is improved, and further, the fuel consumption of the automobile 200 having mounted thereon the fuel cell system FCS is improved.

When the eighth embodiment and the third embodiment are combined, the electric power generated by heat inertia is charged in a battery. When the eighth embodiment and the first or second embodiment are combined, hydrogen is formed by the operation using heat inertia and the fuel is regenerated.

Ninth Embodiment

The ninth embodiment shown in FIGS. 16 and 17 relates to a large scale system for recycling a fuel. The fuel cell system FCS is used as a power source of various equipment used for recycling the fuel, transportation means and the like.

The recovered liquid (by-product) recovered as the used fuel of the automobile 200, the independent power plant and the like is transported to production-regeneration regions (countries) wherein there are a great amount of resources, such as natural gas, petroleum and the like, and the production cost for hydrogen is relatively low. In the production-regeneration regions, the recovered liquid is hydrogenated and the fuel is regenerated or produced. The regenerated or produced fuel is used in the automobile 200 and the independent power plant.

As shown in FIGS. 16 and 17, the recycling system of the ninth embodiment includes mainly nine steps, specifically:
(a) a step in which the fuel is consumed in the automobile 200;
(b) a step in which the automobile 200 is refueled;
(c) a land transportation step in which the fuel and the recovered liquid are transported using a tanker truck 260 between a refueling station 250 and a storage equipment 270;
(d) a storage step in which the fuel and the recovered liquid are temporarily stored in a storage equipment 270;
(e) a sea transportation step in which the fuel and the recovered liquid are transported using a tanker ship 280;
(f) a mining step in which natural resources, such as natural gas, petroleum and the like are mined;
(g) a pipe transportation step in which the mined natural resources are transported through a pipeline;
(h) a step in which hydrogen is formed by the electrolysis of water utilizing the reformation of natural resources and the electric power of a power plant; and
(i) a hydrogenation step in which the fuel is regenerated from the recovered liquid.

The automobile 200 has a vehicle fuel cell system 202 mounted thereon. The tanker truck 260 has a truck fuel cell system 261 mounted thereon. The tanker ship 280 has a ship fuel cell system 281 mounted thereon. Each of the tanker truck 260 and tanker ship 280 is a mobile tanker for liquid transportation. The refueling equipment 250, the storage equipment 270 and a hydrogenation equipment 290 are provided with fuel cell systems 251, 271, 291, respectively, and the power required for the equipment 250, 270, 290 is respectively generated in the corresponding fuel cell systems. In the tanker truck 260, the tanker ship 280, the refueling equipment 250, the storage equipment 270 and the hydrogenation equipment 290, as tanks 262, 282, 252, 272, 292 for transporting or storing the recovered liquid and the fuel, movable partition tanks, which are respectively partitioned by movable partitions 263, 283, 253, 273, 293 into the fuel chamber 13 and the recovery chamber 14, are used. In each of the fuel cell systems 261, 281, 251, 271, 291, a portion of the fuel stored in the corresponding fuel tanks 262, 282, 252, 272, 292 (fuel chamber 13) is used as a fuel for forming hydrogen required for power generation, and the recovered liquid after the use of the fuel is stored in the corresponding tanks 262, 282, 252, 272, 292 (the recovery chamber 14). That is, a portion of the fuel to be transported and stored is used for power generation by fuel cell systems 261, 281, 251, 271, 291 in the mobile tankers 260, 280 for transportation and the equipment 250, 270, 290. The by-product (recovered liquid) formed by the power generation is stored in the tanks 262, 282, 252, 272, 292. That is, the tanks equipped for transportation and storage are also used as fuel tanks for the fuel cell systems 261, 281, 251, 271, 291.

The fuel cell systems 261, 281, 251, 271, 291 are similar to those in the above-mentioned embodiments.

The automobile 200 has mounted thereon the vehicle fuel cell system 202 and the fuel tank 10. The fuel tank 10 is partitioned by a movable partition 203 into a vehicle fuel chamber 13a and the vehicle recovery chamber 14a. The movable partition 203 is deformed depending on the change in the liquid amount, and the volume of each of the vehicle fuel chamber 13a and the vehicle recovery chamber 14a is changed in accordance with the above deformation.

The refueling equipment (refueling station) 250 has the underground fuel tank 252, a fuel out-pump 254, a recovered liquid in-pump 255, a recovered liquid out-pump 256, and a fuel in-pump 257. The underground fuel tank 252 is partitioned by the movable partition 253 into an underground fuel chamber 13b and an underground recovery chamber 14b. When the automobile 200 is refueled, the fuel is supplied from the underground fuel chamber 13b to the vehicle fuel chamber 13a by the driving of the fuel out-pump 254 while the recovered liquid in the vehicle recovery chamber 14a is recovered into the underground recovery chamber 14b by the driving of the recovered liquid in-pump 255. In addition, the fuel cell system 251 is connected to the underground fuel chamber 13b and the underground recovery chamber 14b, and a portion of the fuel stored in the underground fuel chamber 13b is used for power generation and the by-product formed by the power generation is stored in the underground recovery chamber 14b.

The tanker truck 260 has mounted thereon the fuel cell system 261 and the liquid transportation tank 262, and in the fuel cell system 261, a portion of the fuel stored in a land transportation fuel chamber 13c of the liquid transportation tank 262 is used for power generation and the by-product formed by the power generation is stored in a land transportation recovery chamber 14c of the liquid transportation tank 262. The liquid transportation tank 262 is partitioned by the movable partition 263, for example, a piston into the land transportation fuel chamber 13c and the land transportation recovery chamber 14c. The movable partition 263 moves depending on the change in the liquid amount to change the volume of each of the land transportation fuel chamber 13c and the land transportation recovery chamber 14c. The tanker truck 260 transports the fuel and the recovered liquid by land between the refueling equipment 250 and the storage equipment 270. When the tanker truck 260 transports the fuel in the storage equipment 270 to the refueling equipment 250, in the refueling equipment 250, the fuel is fed from the land transportation fuel chamber 13c to the underground fuel chamber 13b through refueling hose 258 by the driving of a fuel in-pump 257 while the recovered liquid in the underground recovery chamber 14b is recovered into the land transportation recovery chamber 14c through an oil discharging hose 259 by the driving of a recovered liquid out-pump 256.

The storage equipment 270 has the harbor tank 272, the harbor fuel cell system 271, a harbor refueling station 274, and a harbor recovery station 275. The harbor tank 272 has a structure in which, for example, an extensible upper container 272a and an extensible lower container 272b are joined to each other. The joint portion in the harbor tank 272 is a movable partition 273. The movable partition 273 separates a lower fuel chamber 13d and an upper recovery chamber 14d. The movement of the movable partition 273 causes the volume of each of the two chambers 13d, 14d to be changed. The harbor fuel cell system 271 and the stations 274, 275 are connected to the lower fuel chamber 13d and the upper recovery chamber 14d. In harbor fuel cell system 271, a portion of the fuel stored in the lower fuel chamber 13d is used for power generation and the by-product formed by the power generation is stored in the upper recovery chamber 14d.

When the tanker truck 260 transports the recovered liquid in the refueling equipment 250 to the storage equipment 270, in the storage equipment 270, the recovered liquid in the land transportation recovery chamber 14c is recovered into the upper recovery chamber 14d by the driving of harbor recovered liquid in-pump 276 while the fuel in the lower fuel chamber 13d is fed to the land transportation fuel chamber 13c by the driving of harbor fuel out-pump 277.

The tanker ship 280 has a ship fuel cell system 281 and a ship tank 282 mounted thereon. The ship tank 282 is partitioned by a movable partition 283 made of a membrane into a ship fuel chamber 13e and a ship recovery chamber 14e. The deformation of the movable partition 283 causes the volume of each of the ship fuel chamber 13e and the ship recovery chamber 14e to be changed. In the ship fuel cell system 281, a portion of the fuel stored in the ship fuel chamber 13e is used for power generation and the by-product formed by the power generation is stored in the ship recovery chamber 14e. The tanker ship 280 navigates between the harbor having the storage equipment 270 and the harbor having the hydrogenation equipment 290, and transports the fuel and the recovered liquid by sea. When the tanker ship 280 transports the fuel in the hydrogenation equipment 290 to storage equipment 270 by sea, the fuel in the ship fuel chamber 13e is fed to the lower fuel chamber 13d through a refueling hose 284 by the driving of a harbor in-pump 278 while the recovered liquid in the upper recovery chamber 14d is recovered into the ship recovery chamber 14e through an oil discharging hose 285 by the driving of a harbor out-pump 279.

As shown in FIG. 17, the hydrogenation equipment 290 has the land fuel cell system 291, the land tank 292, a hydrogenation apparatus 294, and a land refueling station 295. The land tank 292 is partitioned by a movable partition 293 made of, for example, a membrane into a land fuel chamber 13i and a land recovery chamber 14i. The movable partition 293 is deformed depending on the change in the liquid amount, and this deformation causes the volume of each of the land fuel chamber 13i and the land recovery chamber 14i to be changed. The land fuel cell system 291, the hydrogenation apparatus 294 and the land refueling station 295 are connected to the land fuel chamber 13i and the land recovery chamber 14i. When the tanker ship 280 transports the recovered liquid from the storage equipment 270 to the hydrogenation equipment 290 by ship, the recovered liquid in the ship recovery chamber 14e is recovered into the land recovery chamber 14i through a refueling hose 296 by the driving of a pump 297 while the fuel in the land fuel chamber 13i is fed to the ship fuel chamber 13e through an oil discharging hose 299 by the driving of a pump 298.

The hydrogenation apparatus 294 is equipment having a hydrogenation reactor, and hydrogenates the recovered liquid stored in the land recovery chamber 14i to regenerate the fuel. The regenerated fuel is stored in the land fuel chamber 13i. In the land fuel cell system 291, a portion of the fuel in the land fuel chamber 13i is used for power generation and the by-product formed by the power generation is stored in the land recovery chamber 14i.

A refining apparatus 340 refines the natural gas and petroleum mined by a mining machine 330 into methane and methanol. The methane and methanol refined are transported to a land tank 360 through a pipeline 350. A reformation apparatus 300 reforms (for example, by steam reformation) methane or methanol in the land tank 360 to produce hydrogen gas. An electrolysis apparatus 320 electrolyzes water using the electric power from a nuclear power plant 310 to produce hydrogen gas. The hydrogen gas is supplied to the hydrogenation apparatus 294 from the reformation apparatus 300 and/or the electrolysis apparatus 320.

In the system for recycling the fuel shown in FIGS. 16 and 17, the recovered liquid in the automobile 200 is first recovered into the refueling equipment 250. The recovered liquid in the refueling equipment 250 is transported using the tanker truck 260 and the tanker ship 280 to the hydrogenation equipment 290 in production-regeneration regions where the production cost for hydrogen is relatively low. In the hydrogenation equipment 290, the fuel is regenerated from the recovered liquid using hydrogen gas produced from natural resources at relatively low cost.

Then, the tanker truck 260 and the tanker ship 280 are driven by the power of an electric actuator using the fuel cell systems 261, 281 as a power source. Further, the tanker truck 260 and the tanker ship 280 generate power using the fuel transported and stored in the tanks 262, 282, and recover the used recovered liquid in the tanks 262, 282.

The electric power to be used in the equipment 250, 270, 290 is supplied by the fuel cell systems 251, 271, 291 using the fuel stored in the tanks 252, 272, 292 provided on the equipment 250, 270, 290. Then, the recovered liquid is stored in the tanks 252, 272, 292. That is, all the electric power used in, for example, pumps and lighting, is supplied by power generation of the fuel cell systems 251, 271, 291.

According to the ninth embodiment, the following advantages are obtained.

(15) The tanker truck 260 and the tanker ship 280 are operated using a portion of the fuel being transported. Therefore, the fuel cell systems 261, 281 for the tanker truck 260 and the tanker ship 280 do not require tanks for their exclusive use. Thus, the tanker truck 260 and the tanker ship 280 can be downsized. Since the tanks 262, 282 for transportation are movable partition type tanks, they are of small size although having two chambers, and can transport a relatively large amount of the fuel and the recovered liquid.

(16) The electric power for lighting and the like used in each of the equipment 250, 270, 290 is supplied by the power generation of the corresponding fuel cell systems 251, 271, 291 using the fuel stored. Further, the recovered liquid formed by the power generation is recovered into the corresponding tanks 252, 272, 292. Therefore, the fuel cell systems 251, 271, 291 do not require tanks for their exclusive use, and thus, the equipment 250, 270, 290 can be downsized. Since the tanks 252, 272, 292 for storage are movable partition type tanks, they are of small size although having two chambers, and can store a relatively large amount of the fuel and the recovered liquid.

(17) It is possible to construct the large-scale fuel recycling system shown in FIGS. 16 and 17 so as to discharge almost no carbon dioxide gas, and thus, it is preferred from an environmental point of view.

The above-mentioned first to ninth embodiments can be changed as follows.

Figure 18A:
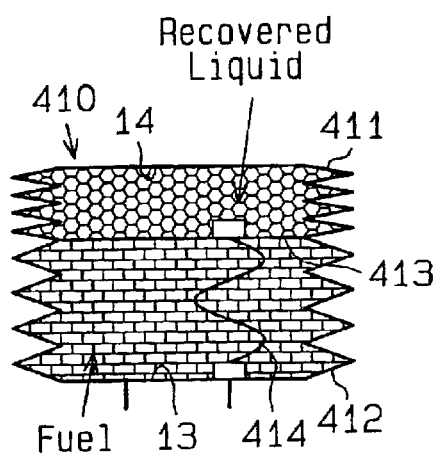
FIGS. 18a, 18b, 19a and 19b are sectional side elevations of other fuel tanks.
Figure 18B:
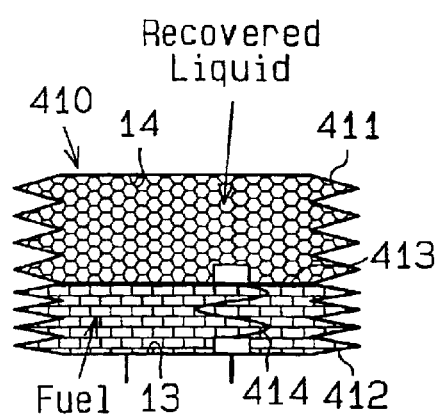

In each of the first to ninth embodiments, a fuel tank 410 shown in FIGS. 18a and 18b can be used. The fuel tank 410 is formed by joining two-stage extensible containers 411, 412. In the two extensible containers 411, 412 are formed the fuel chamber 13 and the recovery chamber 14. The joint portion 413 of the two extensible containers 411, 412 is a movable partition. The liquid in the recovery chamber 14 is discharged through a tube 414.

Figure 19A:
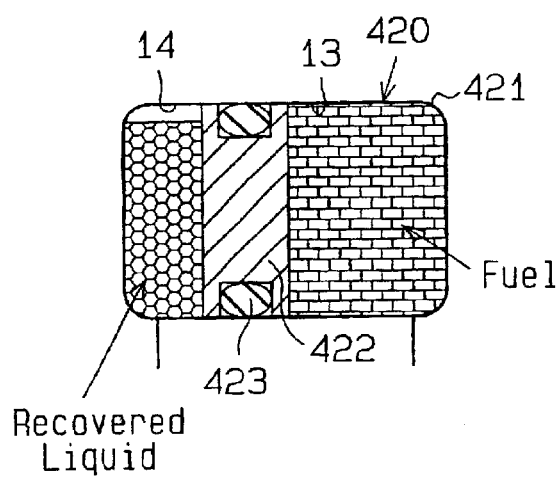
Figure 19B:
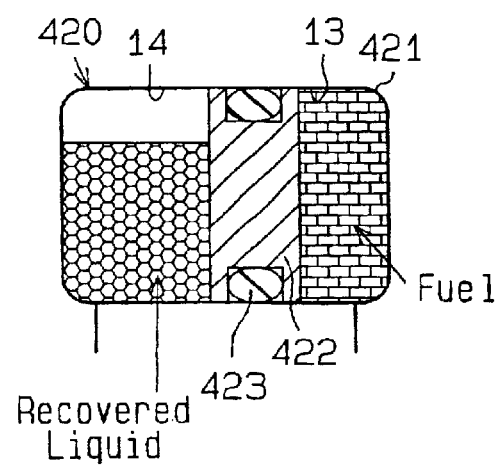

In each of the first to ninth embodiments, a fuel tank 420 shown in FIGS. 19a and 19b can be used. The fuel tank 420 contains a piston 422 as a movable partition. The piston 422 separates the fuel chamber 13 and the recovery chamber 14. By a seal element 423 located on the outer surface of piston 422, the fuel chamber 13 is liquid-tightly sealed.

In the fuel tanks 410 and 420, the joint portion 413 and the piston 422 automatically move depending on the amount of the fuel consumed, so that the recovered liquid can be stored in the relatively small-size fuel tanks 410 and 420.

A hydrogen-containing organic compound that undergoes hydrogenation reaction can be used as a fuel. Each of the fuel and the recovered liquid is preferably a liquid at ordinary temperature, but is not necessarily a liquid at ordinary temperature. For example, a solid compound having a melting point of 100° C. or lower may be used. Such a solid compound is used after liquefied by heating. Further, for example, a gaseous compound having a boiling point of −10° C. or higher may be used. Such a gaseous compound is used after liquefied by cooling.

For example, there are used an alcohol that undergoes separation into a ketone and hydrogen by dehydrogenation reaction, a saturated hydrocarbon that undergoes separation into an unsaturated hydrocarbon and hydrogen by dehydrogenation reaction, and a cyclic saturated hydrocarbon that undergoes separation into a cyclic unsaturated hydrocarbon, such as an aromatic hydrocarbon or the like, and hydrogen by dehydrogenation reaction.

In each of the first to third embodiments, even when the hydrogenation reactor is omitted, the waste heat of the fuel cell 1 can be used as a heat source of the dehydrogenation reaction.

In each of the first and second embodiments, power generation means can be employed as heat discharge means. For example, a heat engine-type power generator capable of heating to a temperature at which it is possible to generate steam required for driving a heat engine for power generation can be used. When it can heat to only a relatively low temperature (200° C. or lower), a thermo electric generating element is used.

The power of the heat engine using heat discharged can also be used for the purpose other than the power generation. For example, the power may be used for driving an auxiliary apparatus.

In each of the first to ninth embodiments, a metal alloy having hydrogen absorbed therein (hydrogen absorption metal alloy) can be used. In this case, hydrogen is temporarily stored in the hydrogen absorption metal alloy. Since the amount of the hydrogen absorption metal alloy required is small, the increase in the weight of the system is small.

The medium for the first chemical heat pump is not limited to a hydrocarbon compound. The first chemical heat pump, which is not of hydrogenation-dehydrogenation reaction system, is used.

In addition to the chemical heat pump, a mechanical heat pump and a heater are used in combination.

A three or more-stage chemical heat pump is used.

In the fourth embodiment, cyclohexane and/or methylcyclohexane can be used as a fuel. In such a case, benzene and/or toluene, which is the recovered liquid, is burned by a burner, and the heat of combustion is used as a heat source of the dehydrogenation reactor. The heating temperature of the dehydrogenation reactor by the burner is set to the dehydrogenation reaction temperature (about 200° C.) of this fuel.

In each of the first to ninth embodiments, the dehydrogenation reactor may be placed outside the fuel cell 1.

In each of the first to ninth embodiments, the structure of the fuel tank can be changed. For example, the movement of the movable partition may be controlled. The fuel chamber and the recovery chamber may be provided in different tanks. Particularly, the movable partitions in the transportation tanks 262, 282 mounted on the tanker truck 260 and the tanker ship 280 can be changed to, for example, motorized movable partitions.

The fuel cell system FCS may be used in other applications than vehicles, household appliances, and ship and land equipment.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A hydrogen supply system for supplying hydrogen to a fuel cell, the system comprising:

a fuel chamber for storing a liquid fuel, which includes a hydrogen containing organic compound;

a dehydrogenation apparatus for dehydrogenating the fuel to form hydrogen gas and a by-product;

a gas-liquid separation apparatus for separating the hydrogen gas from the by-product by liquefying the by-product and for supplying the separated hydrogen gas to the fuel cell; and a recovery chamber for recovering and storing the by-product liquefied in the gas-liquid separation apparatus.

2. The hydrogen supply system according to claim 1, wherein the volume of each of the fuel chamber and the recovery chamber is changeable, and the volume of the fuel chamber is decreased depending on the amount of the fuel consumed and the volume of the recovery chamber is increased by the decreased volume of the fuel chamber.

3. The hydrogen supply system according to claim 2, further comprising:

a container for enclosing the fuel chamber and the recovery chamber; and a movable partition located in the container for partitioning the inner portion of the container into the fuel chamber and the recovery chamber, wherein the movable partition is moved depending on the amount of fuel in the fuel chamber and the amount of the by-product in the recovery chamber.

4. The hydrogen supply system according to claim 1, wherein the by-product is combustible, wherein the hydrogen supply system further includes a combustion element for burning the by-product outside the recovery chamber, wherein the heat of combustion of the by-product is used as a heat source of the hydrogen supply system.

5. The hydrogen supply system according to claim 1, wherein the fuel cell is maintained at the predetermined operation temperature, and wherein the dehydrogenation apparatus uses heat generated from the fuel cell as a heat source to dehydrogenate the fuel.

6. The hydrogen supply system according to claim 5, further comprising a first chemical heat pump, in which a fluid flows for absorbing heat generated from the fuel cell, wherein the first chemical heat pump increases the temperature of the fluid to a predetermined temperature sufficient to dehydrogenate the fuel, wherein heat is transferred from the fluid to the dehydrogenation apparatus.

7. The hydrogen supply system according to claim 6, wherein the fluid includes the fuel.

8. The hydrogen supply system according to claim 5, further comprising a hydrogenation apparatus for hydrogenating the by-product to regenerate the fuel, wherein the dehydrogenation apparatus and the hydrogenation apparatus form a second chemical heat pump, the second chemical heat pump having a heat exchange element for subjecting the heat of the hydrogenation apparatus to heat transfer inside the second heat pump.

9. The hydrogen supply system according to claim 1, further comprising:

a chemical heat pump system, which absorbs waste heat from the fuel cell and generates higher temperatures than that of the fuel cell; and a heat exhauster for exhausting at least part of the higher heat.

10. The hydrogen supply system according to claim 9, wherein the dehydrogenation reaction is an endothermic reaction, and wherein the chemical heat pump system includes a plurality of chemical heat pumps, and one of the chemical heat pumps is a hydrogenation-dehydrogenation reaction-system chemical heat pump having the dehydrogenation apparatus.

11. The hydrogen supply system according to claim 9, wherein the chemical heat pump system includes an endothermic reaction apparatus and an exothermic reaction apparatus that use a fluid capable of being dehydrogenated at the operation temperature of the fuel cell, the endothermic reaction apparatus being incorporated into the fuel cell for dehydrogenating the fluid at the operation temperature of the fuel cell to form the hydrogen and the by-product, and wherein the exothermic reaction apparatus hydrogenates the by-product.

12. The hydrogen supply system according to claim 11, wherein the fuel cell comprises a fuel electrode, an air electrode, and a separator plate for separating the fuel electrode and the air electrode, the separator plate having a surface on a fuel electrode side and another surface on an air electrode side, wherein the endothermic reaction apparatus includes a reaction path defined between the surface of the separator plate on the fuel electrode side and the surface of the separator plate on the air electrode side, and a catalyst is located in the reaction path, the endothermic reaction apparatus being formed integrally with the separator plate.

13. The hydrogen supply system according to claim 8, further comprising a power generation apparatus for receiving heat from the heat exhauster and converting the energy of the heat of the heat exhauster to electricity.

14. The hydrogen supply system according to claim 13, wherein the power generation apparatus includes a heat engine driven by the energy of heat from the heat exhauster and a power generator driven by the heat engine for generating power.

15. The hydrogen supply system according to claim 14, wherein the heat engine includes a scroll extender.

16. The hydrogen supply system according to claim 8, further comprising a heat inertia operation control unit, wherein the hydrogen supply system and the fuel cell are mounted on a vehicle, wherein, when the vehicle is stopped, the heat inertia operation control unit stops the supply of hydrogen to the fuel cell while continuing the operation of the second chemical heat pump within a range such that the energy balance in the chemical heat pump is maintained.

17. The hydrogen supply system according to claim 1, wherein the fuel comprises a hydrocarbon compound in a liquid state at ordinary temperature, and the by-product comprises a hydrocarbon compound in a liquid state at ordinary temperature.

18. The hydrogen supply system according to claim 13, wherein the power generation apparatus includes a thermo electric generating element.

19. A hydrogen supply system for supplying hydrogen to a fuel cell, the system comprising:

a fuel chamber for storing a liquid fuel, which comprises an organic compound containing hydrogen;

a chemical heat pump for circulating fuel fed from the fuel chamber at a temperature between the ambient temperature of the fuel chamber and a predetermined temperature sufficient to dehydrogenate the fuel, the chemical heat pump including a dehydrogenation apparatus for dehydrogenating the fuel to form hydrogen gas and a by-product and a gas-liquid separation apparatus for liquefying the by-product to separate the hydrogen gas from the by-product, wherein the separated hydrogen gas is supplied to the fuel cell; and a recovery chamber for storing the by-product in a liquid state.

20. The hydrogen supply system according to claim 19, wherein the chemical heat pump further comprises a hydrogenation apparatus for hydrogenating the by-product to regenerate the fuel, wherein the chemical heat pump heats the fuel using the heat of the hydrogenation apparatus prior to feeding the fuel to the dehydrogenation apparatus.

21. The hydrogen supply system according to claim 19, wherein the chemical heat pump heats the fuel using waste heat of the fuel cell prior to feeding the fuel to the dehydrogenation apparatus.

22. The hydrogen supply system according to claim 21, wherein heat of operation of the fuel cell is transferred to the dehydrogenation apparatus in the chemical heat pump and is transferred from the hydrogenation apparatus.

23. The hydrogen supply system according to claim 21, wherein the chemical heat pump heats the hydrogen gas and the by-product using heat from the hydrogenation apparatus prior to feeding the hydrogen gas and the by-product to the hydrogenation apparatus.

24. The hydrogen supply system according to claim 19, wherein the volume of each of the fuel chamber and the recovery chamber is changeable, and the volume of the fuel chamber decreases depending on the amount of the fuel consumed and the volume of the recovery chamber increases by the decreased volume of the fuel chamber.

25. The hydrogen supply system according to claim 24, further comprising:

a container for enclosing the fuel chamber and the recovery chamber; and a movable partition located in the container for partitioning the inner portion of the container into the fuel chamber and the recovery chamber, wherein the movable partition is moved depending on the amount of fuel in the fuel chamber and the amount of the by-product in the recovery chamber.

* * * * *

UNITED STATES PATENT AND TRADEMARK OFFICE
CERTIFICATE OF CORRECTION

PATENT NO. : 6,802,875 B1 Page 1 of 1
DATED : October 12, 2004
INVENTOR(S) : Masahiko Kimbara et al.

It is certified that error appears in the above-identified patent and that said Letters Patent is hereby corrected as shown below:

Column 11,
Line 61, should read -- $C_6H_{12}(gas) \rightarrow C_6H_6(gas) + 3H_2(gas) - 207$ kJ/mol. --

Signed and Sealed this

Eighth Day of March, 2005

JON W. DUDAS
*Director of the United States Patent and Trademark Office*